US012453941B2

(12) United States Patent
Fujita et al.

(10) Patent No.: US 12,453,941 B2
(45) Date of Patent: Oct. 28, 2025

(54) CARBON DIOXIDE CAPTURE SYSTEM AND METHOD OF OPERATING CARBON DIOXIDE CAPTURE SYSTEM

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Koshito Fujita, Yokohama Kanagawa (JP); Daigo Muraoka, Kawasaki Kanagawa (JP); Yasuhiro Kato, Kawasaki Kanagawa (JP); Yusuke Handa, Kita Tokyo (JP); Satoshi Saito, Yamato Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 43 days.

(21) Appl. No.: 17/575,994

(22) Filed: Jan. 14, 2022

(65) Prior Publication Data
US 2022/0226770 A1 Jul. 21, 2022

(30) Foreign Application Priority Data
Jan. 15, 2021 (JP) ................. 2021-005073

(51) Int. Cl.
*B01D 53/14* (2006.01)
*B01D 53/18* (2006.01)
*B01D 53/92* (2006.01)

(52) U.S. Cl.
CPC ..... *B01D 53/1475* (2013.01); *B01D 53/1425* (2013.01); *B01D 53/1493* (2013.01); *B01D 53/185* (2013.01); *B01D 53/92* (2013.01); *B01D 2252/204* (2013.01); *B01D 2257/504* (2013.01); *B01D 2258/01* (2013.01)

(58) Field of Classification Search
CPC ............ B01D 53/1475; B01D 53/1425; B01D 53/1493; B01D 53/185; B01D 53/92;
(Continued)

(56) References Cited

U.S. PATENT DOCUMENTS 3,823,222 A * 7/1974 Benson .............. B01D 53/1462
423/232
4,702,898 A * 10/1987 Grover ...................... C01B 3/52
423/220

(Continued)

FOREIGN PATENT DOCUMENTS

| CN | 103930188 A | 7/2014 |
| CN | 105597495 A | 5/2016 |

(Continued)

OTHER PUBLICATIONS

Armatec Environmental "Mist Eliminators" published Jan. 20, 2019 accessed at <https://web.archive.org/web/20190120034423/https://www.armatec.co.nz/mist-eliminators> (Year: 2019).*

(Continued)

*Primary Examiner* — Stephen Hobson
(74) *Attorney, Agent, or Firm* — Foley & Lardner LLP

(57) ABSTRACT

A carbon dioxide capture system according to an embodiment includes: a carbon dioxide capturer, an absorbing liquid regenerator, a first washer, a second washer, and an absorbing liquid line. The first washer washes the combustion exhaust gas discharged from the carbon dioxide capturer with a mist of a first cleaning liquid sprayed by a first spray to capture the amine accompanying the combustion exhaust gas. The absorbing liquid line supplies the absorbing liquid regenerated in the absorbing liquid regenerator as the first cleaning liquid to the first spray. The first cleaning liquid sprayed by the first spray is supplied as the absorbing liquid to the carbon dioxide capturer.

14 Claims, 11 Drawing Sheets

(58) Field of Classification Search
CPC ........ B01D 2252/204; B01D 2257/504; B01D 2258/01; B01D 53/14; B01D 53/18; Y02C 20/40
See application file for complete search history.

(56) References Cited

U.S. PATENT DOCUMENTS

| | | | | |
|---|---|---|---|---|
| 5,486,341 A * | 1/1996 | Bresowar | B01D 45/08 | 423/243.08 |
| 5,648,048 A * | 7/1997 | Kuroda | B01D 53/504 | 422/168 |
| 6,689,332 B1 * | 2/2004 | Yoshida | B01D 53/1475 | 423/220 |
| 6,784,320 B2 * | 8/2004 | Mimura | B01D 53/1475 | 564/497 |
| 6,883,327 B2 * | 4/2005 | Iijima | B01D 53/1475 | 60/671 |
| 7,906,087 B2 * | 3/2011 | Aroonwilas | B01D 53/18 | 423/220 |
| 8,052,948 B2 * | 11/2011 | Iijima | B01D 53/1425 | 423/220 |
| 8,398,758 B2 * | 3/2013 | Nagayasu | B01D 53/1418 | 96/243 |
| 8,501,130 B1 * | 8/2013 | Tsujiuchi | B01D 53/1425 | 423/220 |
| 8,506,693 B2 * | 8/2013 | Nagayasu | B01D 53/1475 | 423/288 |
| 8,597,412 B2 * | 12/2013 | Tanaka | B01D 53/1412 | 95/193 |
| 8,679,431 B2 * | 3/2014 | Nagayasu | B01D 53/62 | 423/220 |
| 8,871,164 B2 * | 10/2014 | Nagayasu | B01D 53/75 | 423/220 |
| 9,050,555 B2 * | 6/2015 | Iijima | B01D 53/1425 | |
| 9,227,154 B2 * | 1/2016 | Yoshizumi | B01D 53/1475 | |
| 9,421,491 B2 * | 8/2016 | Tsujiuchi | B01D 53/62 | |
| 9,555,363 B2 * | 1/2017 | Hodotsuka | B01D 53/1475 | |
| 9,901,872 B2 * | 2/2018 | Nagayasu | B01D 53/78 | |
| 9,914,088 B2 * | 3/2018 | Tanaka | B01D 53/18 | |
| 9,993,766 B2 | 6/2018 | Chiba et al. | | |
| 10,449,481 B2 * | 10/2019 | Yukumoto | B01D 53/1425 | |
| 10,518,213 B2 | 12/2019 | Fujita et al. | | |
| 10,596,514 B2 * | 3/2020 | Kaseda | B01D 53/1462 | |
| 10,850,227 B2 * | 12/2020 | Murai | B01D 53/18 | |
| 11,090,603 B2 * | 8/2021 | Murai | B01D 53/1493 | |
| 11,214,490 B1 * | 1/2022 | D'Angelo | B01D 53/504 | |
| 11,235,277 B2 * | 2/2022 | Fujita | B01D 53/78 | |
| 2003/0045756 A1 | 3/2003 | Mimura et al. | | |
| 2003/0056648 A1 * | 3/2003 | Fornai | B01D 50/60 | 95/149 |
| 2005/0132883 A1 * | 6/2005 | Su | C10K 3/04 | 423/220 |
| 2007/0053817 A1 * | 3/2007 | Iijima | B01D 53/1425 | 423/220 |
| 2007/0086931 A1 * | 4/2007 | Raoux | B01D 53/8659 | 422/177 |
| 2008/0056972 A1 * | 3/2008 | Iijima | B01D 53/1425 | 423/220 |
| 2009/0193970 A1 * | 8/2009 | Iijima | B01D 61/14 | 95/186 |
| 2009/0277334 A1 * | 11/2009 | Oda | B01D 53/504 | 96/265 |
| 2010/0011956 A1 * | 1/2010 | Neumann | C10L 3/102 | 261/23.1 |
| 2010/0018248 A1 * | 1/2010 | Fieler | F25J 3/0209 | 62/617 |
| 2010/0267123 A1 * | 10/2010 | Wibberley | B01D 53/1493 | 423/232 |
| 2011/0041685 A1 * | 2/2011 | Tanaka | F23J 15/04 | 95/186 |
| 2012/0122195 A1 * | 5/2012 | Fradette | B01D 53/96 | 435/266 |
| 2012/0180521 A1 * | 7/2012 | Erickson | B01D 53/62 | 96/242 |
| 2012/0325092 A1 * | 12/2012 | Shimamura | B01D 53/1475 | 96/251 |
| 2013/0008310 A1 * | 1/2013 | Aroonwilas | B01D 53/1425 | 95/232 |
| 2013/0042759 A1 * | 2/2013 | Koss | B01D 53/78 | 95/199 |
| 2013/0055756 A1 * | 3/2013 | Tsutsumi | B01D 53/1475 | 62/617 |
| 2013/0164203 A1 * | 6/2013 | Nagayasu | B01D 53/62 | 423/228 |
| 2013/0260442 A1 * | 10/2013 | Vitse | B01D 53/1475 | 435/283.1 |
| 2013/0284021 A1 * | 10/2013 | Miyamoto | B01D 53/1425 | 95/183 |
| 2013/0305924 A1 * | 11/2013 | Nakamura | B01D 53/1475 | 95/162 |
| 2013/0312614 A1 * | 11/2013 | Zainal Abidin | B01D 45/08 | 96/242 |
| 2013/0343974 A1 * | 12/2013 | Murai | B01D 53/1475 | 252/189 |
| 2014/0076166 A1 * | 3/2014 | Nakayama | F23J 15/04 | 96/234 |
| 2014/0116251 A1 * | 5/2014 | Bade | B01D 53/1475 | 95/156 |
| 2014/0123851 A1 * | 5/2014 | Jamtvedt | B29C 48/022 | 261/114.5 |
| 2014/0245888 A1 * | 9/2014 | Tsujiuchi | B01D 53/62 | 95/180 |
| 2014/0345465 A1 * | 11/2014 | Taniguchi | B01D 53/1493 | 96/234 |
| 2015/0030516 A1 * | 1/2015 | Higashi | B01D 53/1425 | 422/168 |
| 2015/0139878 A1 * | 5/2015 | Tanaka | B01D 53/78 | 422/169 |
| 2015/0182906 A1 * | 7/2015 | Tanaka | C01B 32/50 | 95/186 |
| 2015/0217227 A1 * | 8/2015 | Oishi | B01D 53/78 | 422/168 |
| 2015/0353454 A1 * | 12/2015 | Iijima | C01B 3/38 | 422/162 |
| 2016/0001223 A1 * | 1/2016 | Okuno | F23J 15/04 | 422/168 |
| 2016/0151742 A1 * | 6/2016 | Fujita | B01D 53/1475 | 422/170 |
| 2016/0288050 A1 * | 10/2016 | Dube | C25B 9/19 | |
| 2016/0361682 A1 * | 12/2016 | Yukumoto | B01D 53/1475 | |
| 2017/0080411 A1 * | 3/2017 | Fujita | B01D 53/62 | |
| 2017/0100693 A1 * | 4/2017 | Miyamoto | B01D 53/1475 | |
| 2017/0113177 A1 * | 4/2017 | Nakagawa | B01D 53/78 | |
| 2017/0197175 A1 * | 7/2017 | Higgins | B01D 53/1462 | |
| 2017/0361264 A1 * | 12/2017 | Meyer | C10K 1/005 | |
| 2017/0368495 A1 * | 12/2017 | Mabrouk | B01D 53/1493 | |
| 2018/0001252 A1 * | 1/2018 | Yokoyama | B01D 53/1418 | |
| 2018/0001253 A1 * | 1/2018 | Kaseda | B01D 53/1475 | |
| 2018/0001254 A1 * | 1/2018 | Fujita | B01D 53/1412 | |
| 2018/0056231 A1 * | 3/2018 | van Wagensveld | B01D 53/1462 | |
| 2018/0104642 A1 * | 4/2018 | Mabrouk | B01D 53/1475 | |
| 2018/0318760 A1 * | 11/2018 | Hirata | B01D 53/78 | |
| 2019/0001261 A1 * | 1/2019 | Tsujiuchi | B01D 53/1475 | |
| 2019/0030480 A1 * | 1/2019 | Tanaka | B01D 53/1468 | |
| 2019/0091625 A1 * | 3/2019 | Luo | B01D 53/1481 | |
| 2019/0160422 A1 * | 5/2019 | Murai | B01D 53/62 | |
| 2019/0232215 A1 * | 8/2019 | Fujita | B01D 53/1475 | |
| 2019/0270046 A1 * | 9/2019 | Miyamoto | B01D 53/1418 | |
| 2019/0358579 A1 * | 11/2019 | Murai | B01D 53/1493 | |
| 2023/0191314 A1 * | 6/2023 | Tanaka | B01D 53/62 | 423/228 |

FOREIGN PATENT DOCUMENTS

| | | | | |
|---|---|---|---|---|
| CN | 107803068 A | * | 3/2018 | ............ B01D 45/04 |
| CN | 107824027 A | * | 3/2018 | ............ B01D 53/75 |
| CN | 110090530 A | | 8/2019 | |
| GB | 2 572 668 A | | 10/2019 | |

(56) References Cited

FOREIGN PATENT DOCUMENTS

| JP | 2004-323339 | A |   | 11/2004 |         |
|----|-------------|---|---|---------|---------|
| JP | 4274846     | B2|   | 6/2009  |         |
| JP | 2009-531163 | A |   | 9/2009  |         |
| JP | 2009-226367 | A |   | 10/2009 |         |
| JP | 2011-240321 | A |   | 12/2011 |         |
| JP | 2012-030168 | A |   | 2/2012  |         |
| JP | 2012-223661 | A |   | 11/2012 |         |
| JP | 2014-000500 | A |   | 1/2014  |         |
| JP | 2014-004533 | A |   | 1/2014  |         |
| JP | 2014-121672 | A |   | 7/2014  |         |
| JP | 2014185913  | A | * | 10/2014 |         |
| JP | 6045652     | B2|   | 12/2016 |         |
| JP | 6045654     | B2|   | 12/2016 |         |
| JP | 2017-196547 | A |   | 11/2017 |         |
| JP | 2018-192396 | A |   | 12/2018 |         |
| JP | 2018-192444 | A |   | 12/2018 |         |
| JP | 2019-000795 | A |   | 1/2019  |         |
| JP | 2019-098316 | A |   | 6/2019  |         |
| JP | 2019-130463 | A |   | 8/2019  |         |
| JP | 2019-131426 | A |   | 8/2019  |         |
| JP | 2019-202298 | A |   | 11/2019 |         |
| JP | 2021-159892 | A |   | 10/2021 |         |
| WO | WO-2012153706 | A1 | * | 11/2012 | ............ B01D 50/60 |
| WO | WO-2015/186725 | A1 |   | 12/2015 |         |
| WO | WO-2017186769 | A1 | * | 11/2017 | ........... B01D 53/504 |
| WO | WO-2021199567 | A1 | * | 10/2021 | ............ B01D 53/18 |

OTHER PUBLICATIONS

Notice of allowance issued on Jun. 18, 2024, Japanese Patent Application No. 2021-005073.
AU Examination Report for AU Appl. Ser. No. 2024200432 dated Mar. 28, 2025 (5 pages).
CN Notice of allowance for the Chinese Patent Application No. 202210041620.4 issued on May 27, 2025 (11 pages).

\* cited by examiner

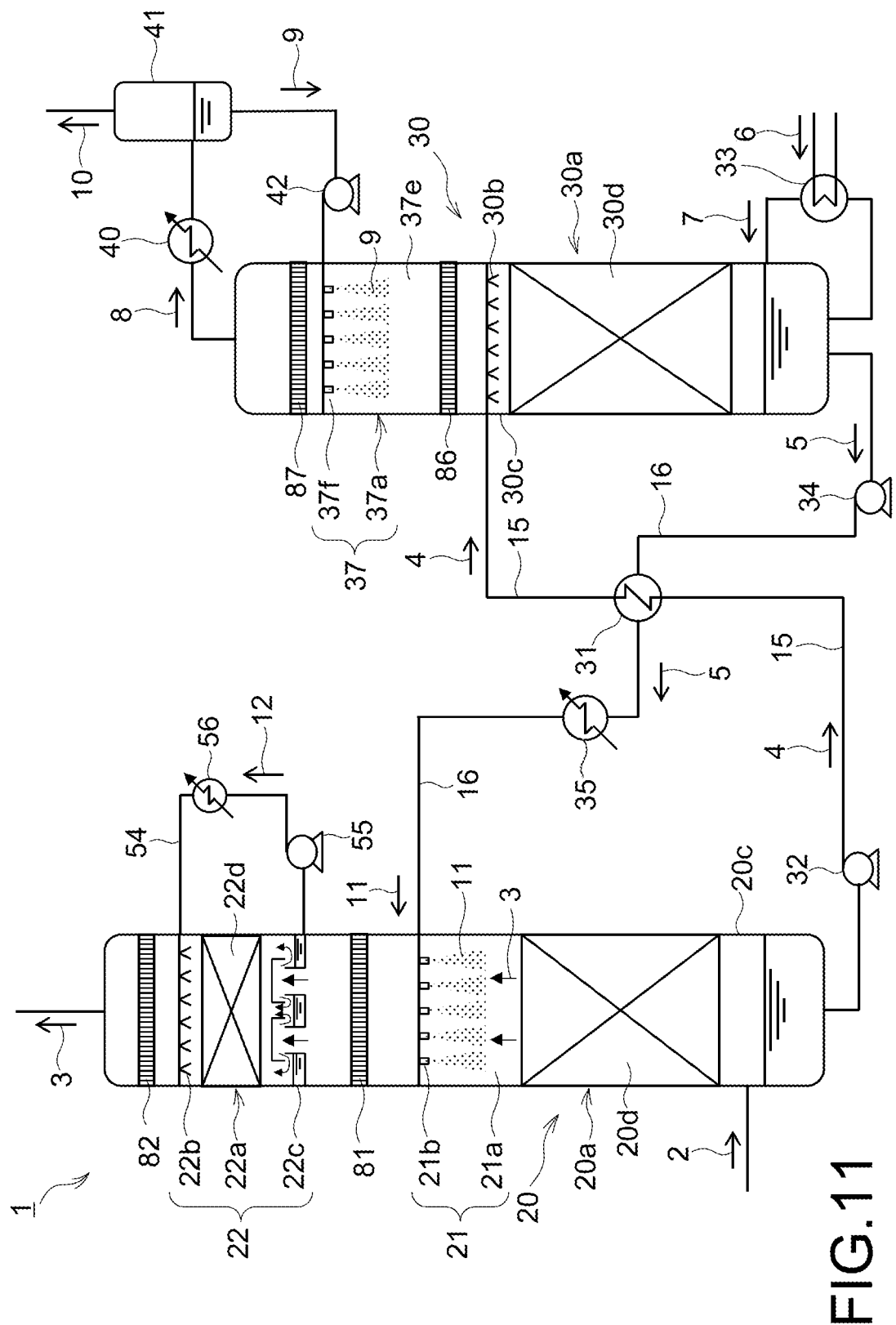

CARBON DIOXIDE CAPTURE SYSTEM AND METHOD OF OPERATING CARBON DIOXIDE CAPTURE SYSTEM

CROSS-REFERENCE TO RELATED APPLICATIONS

This application is based upon and claims the benefit of priority from Japanese Patent Application No. 2021-005073, filed Jan. 15, 2021; the entire contents of which are incorporated herein by reference.

FIELD

Embodiments of the present invention relate to a carbon dioxide capture system and a method of operating the carbon dioxide capture system.

BACKGROUND

In recent years, the greenhouse effect of carbon dioxide contained in a combustion exhaust gas generated at the time of burning fossil fuels has been pointed out as one of the causes of global warming.

Under such circumstances, in a thermal power plant or the like that uses a large amount of fossil fuel, a carbon dioxide capture system is being studied which suppresses the discharge of the carbon dioxide contained in the combustion exhaust gas generated by burning fossil fuel into the atmosphere. In the carbon dioxide capture system, the combustion exhaust gas is brought into contact with an amine-based absorbing liquid, and the carbon dioxide is separated and captured from the combustion exhaust gas.

More specifically, the carbon dioxide capture system includes an absorption column and a regeneration column. The absorption column is configured to cause the carbon dioxide contained in a combustion exhaust gas to be absorbed into an amine-based absorbing liquid. The absorbing liquid (rich liquid) absorbing the carbon dioxide is supplied from the absorption column to the regeneration column, and the regeneration column heats the supplied rich liquid to release the carbon dioxide from the rich liquid and regenerates the absorbing liquid. A reboiler for supplying a heat source is connected to the regeneration column, and the rich liquid is heated in the regeneration column. The absorbing liquid (lean liquid) regenerated in the regeneration column is supplied to the absorption column, and the absorbing liquid is configured to circulate in this system.

However, in such a carbon dioxide capture system, the combustion exhaust gas (decarbonated combustion exhaust gas) from which the carbon dioxide is absorbed into the amine-based absorbing liquid in the absorption column accompanies an amine when discharged to the atmosphere from the absorption column. That is, since a large amount of combustion exhaust gas is discharged from a thermal power plant or the like, a large amount of an amino group-containing compound (amine) may be discharged along with the decarbonated combustion exhaust gas. On the other hand, the carbon dioxide-containing gas containing the carbon dioxide also accompanies an amine when discharged from the regeneration column. For this reason, when the carbon dioxide capture system is used in the thermal power plant, it is desired to effectively reduce the amine discharged from the carbon dioxide capture system.

BRIEF DESCRIPTION OF THE DRAWINGS

FIG. 11 is a diagram illustrating an overall configuration of a carbon dioxide capture system according to a tenth embodiment of the present invention.

DETAILED DESCRIPTION

Figure 1:
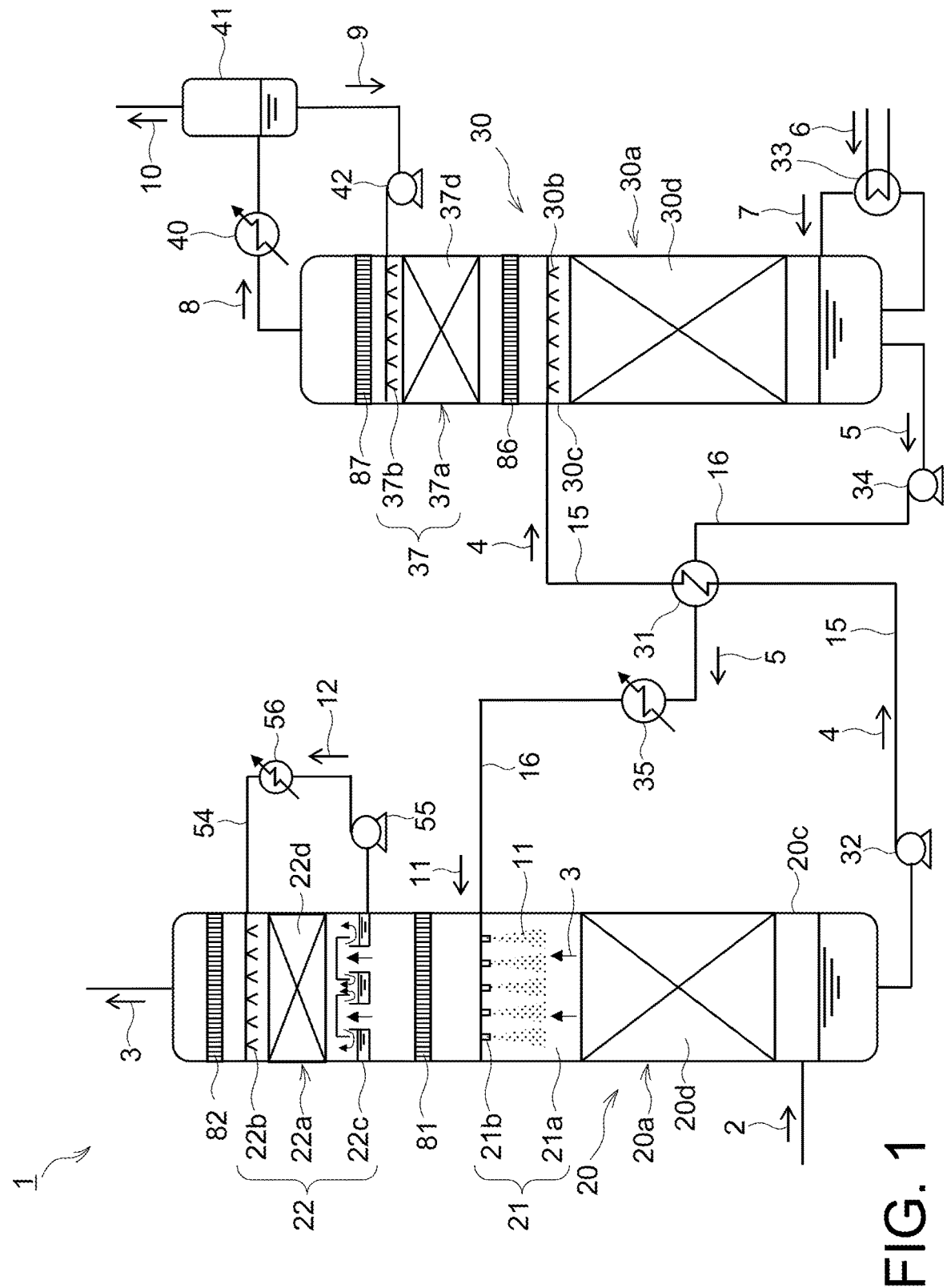
FIG. 1 is a diagram illustrating an overall configuration of a carbon dioxide capture system according to a first embodiment of the present invention.

A carbon dioxide capture system according to the embodiment includes a carbon dioxide capturer, an absorbing liquid regenerator, a first washer, a second washer, and an absorbing liquid line. The carbon dioxide capturer causes a carbon dioxide contained in a combustion exhaust gas to be absorbed into an absorbing liquid containing an amine. The absorbing liquid regenerator causes the carbon dioxide to be released from the absorbing liquid discharged from the carbon dioxide capturer to regenerate the absorbing liquid. The first washer washes the combustion exhaust gas discharged from the carbon dioxide capturer with a mist of a first cleaning liquid sprayed by a first spray to capture the amine accompanying the combustion exhaust gas. The second washer washes the combustion exhaust gas discharged from the first washer with a second cleaning liquid to capture the amine accompanying the combustion exhaust gas. The absorbing liquid line supplies the absorbing liquid regenerated in the absorbing liquid regenerator as the first cleaning liquid to the first spray. The first cleaning liquid sprayed by the first spray is supplied as the absorbing liquid to the carbon dioxide capturer.

A carbon dioxide capture system according to an embodiment includes a carbon dioxide capturer, an absorbing liquid regenerator, and a regeneration washer. The carbon dioxide capturer causes a carbon dioxide contained in a combustion exhaust gas to be absorbed into an absorbing liquid containing an amine. The absorbing liquid regenerator causes the carbon dioxide to be released from the absorbing liquid discharged from the carbon dioxide capturer to discharge a regeneration exhaust gas containing the carbon dioxide and regenerate the absorbing liquid. The regeneration washer washes the regeneration exhaust gas discharged from the absorbing liquid regenerator with a mist of a regeneration cleaning liquid sprayed by a regeneration spray to capture an amine accompanying the regeneration exhaust gas.

A method of operating a carbon dioxide capture system according to an embodiment includes causing a carbon dioxide contained in a combustion exhaust gas to be absorbed into an absorbing liquid containing an amine in a carbon dioxide capturer. The operation method includes causing the carbon dioxide to be released from the absorbing liquid discharged from the carbon dioxide capturer to regenerate the absorbing liquid. The operation method includes washing the combustion exhaust gas discharged from the carbon dioxide capturer with a mist of a first cleaning liquid sprayed by a spray in a first washer and capturing the amine accompanying the combustion exhaust gas. The operation method includes washing the combustion exhaust gas discharged from the first washer with a second cleaning liquid and capturing the amine accompanying the combustion exhaust gas. The absorbing liquid regenerated in regenerating the absorbing liquid is supplied as the first cleaning liquid to the first spray. The first cleaning liquid sprayed by the first spray is supplied as the absorbing liquid to the carbon dioxide capturer.

A method of operating a carbon dioxide capture system according to an embodiment includes causing a carbon dioxide contained in a combustion exhaust gas to be absorbed into an absorbing liquid containing an amine in a carbon dioxide capturer. The operation method includes causing the carbon dioxide to be released from the absorbing liquid discharged from the carbon dioxide capturer to discharge a regeneration exhaust gas containing the carbon dioxide and regenerate the absorbing liquid in an absorbing liquid regenerator. The operation method includes washing the regeneration exhaust gas discharged from the absorbing liquid regenerator with a mist of a regeneration cleaning liquid sprayed by a regeneration spray in a regeneration washer and capturing the amine accompanying the regeneration exhaust gas.

Hereinafter, with reference to the drawings, a description will be given of a carbon dioxide capture system and a method of operating the carbon dioxide capture system in an embodiment of the present invention.

First Embodiment

First, a carbon dioxide capture system and a method of operating the carbon dioxide capture system according to a first embodiment of the present invention will be described with reference to FIGS. 1 and 2.

As illustrated in FIG. 1, a carbon dioxide capture system 1 includes an absorption column 20 that causes carbon dioxide contained in a combustion exhaust gas 2 to be absorbed into an amine-containing absorbing liquid, and a regeneration column 30 that releases the carbon dioxide from the absorbing liquid discharged from the absorption column 20 to regenerate the absorbing liquid. The combustion exhaust gas 2 from which the carbon dioxide is absorbed into the absorbing liquid in the absorption column 20 is discharged as a decarbonated combustion exhaust gas 3 (described later) from the absorption column 20. Further, a carbon dioxide-containing gas 8 (regeneration exhaust gas) containing carbon dioxide is discharged from the regeneration column 30. Incidentally, the combustion exhaust gas 2 supplied to the absorption column 20 is not particularly limited. However, the combustion exhaust gas 2 may be, for example, a combustion exhaust gas of a boiler (not illustrated) of a thermal power plant, a process exhaust gas, or the like, and may be supplied to the absorption column 20 after a cooling process as needed.

The absorbing liquid circulates through between the absorption column 20 and the regeneration column 30. The absorbing liquid absorbs carbon dioxide in the absorption column 20 to be a rich liquid 4, and releases the carbon dioxide in the regeneration column 30 to be a lean liquid 5. The absorption column 20 and the regeneration column 30 are connected by a rich liquid line 15 and a lean liquid line 16. The rich liquid line 15 supplies the rich liquid 4 discharged from the absorption column 20 to the regeneration column 30. The lean liquid line 16 (absorbing liquid line) supplies the lean liquid 5 discharged from the regeneration column 30 to the first spray 21b of the absorption column 20.

The absorbing liquid is not particularly limited. However, for example, alcoholic hydroxyl group-containing primary amine such as monoethanolamine and 2-amino-2-methyl-1-propanol, alcoholic hydroxyl group-containing secondary amine such as diethanolamine and 2-methylaminoethanol, alcoholic hydroxyl group-containing tertiary amine such as triethanolamine and N-methyldiethanolamine, polyethylene polyamine such as ethylenediamine, triethylenediamine, and diethylenetriamine, piperazine, piperidine, cyclic amine such as pyrrolidine, polyamine such as xylylenediamine, amino acid such as methylaminocarboxylic acid, and the like, and mixtures thereof can be used. These amine compounds are usually used as an aqueous solution of 10 to 70% by weight. In addition, a carbon dioxide absorption promoter or a corrosion inhibitor, and further, methanol, polyethylene glycol, sulfolane, or the like as another medium can be added to the absorbing liquid.

The absorption column 20 includes a carbon dioxide capturer 20a and an absorption column container 20c that houses the carbon dioxide capturer 20a.

The carbon dioxide capturer 20a is configured as a countercurrent gas-liquid contact device. As an example, the carbon dioxide capturer 20a includes a carbon dioxide capture packed bed 20d. The carbon dioxide capture packed bed 20d is configured by an internal structure such as packing or particles filled inside to increase the gas-liquid contact area. While the lean liquid 5 supplied from the regeneration column 30 flows down on the surface of the internal structure, the lean liquid 5 is brought into gas-liquid contact with carbon dioxide contained in the combustion exhaust gas 2, and the carbon dioxide is absorbed into the lean liquid 5. Accordingly, the carbon dioxide is captured (or removed) from the combustion exhaust gas 2.

In this embodiment, a liquid diffuser 20b illustrated in FIG. 3 and the like to be described later is not provided. The lean liquid 5 is supplied to the carbon dioxide capturer 20a from the first spray 21b described later. The above-described lean liquid line 16 is connected to the first spray 21b, and the lean liquid 5 is supplied as the first cleaning liquid 11 to the first spray 21b. That is, the first cleaning liquid 11 sprayed from the first spray 21b is formed of the lean liquid 5. By spraying the first cleaning liquid 11 from the first spray 21b, the mist of the first cleaning liquid 11 is diffused and dropped toward the carbon dioxide capturer 20a. The first cleaning liquid 11 that has reached the carbon dioxide capturer 20a is supplied as the lean liquid 5 to the surface of the internal structure of the carbon dioxide capture packed bed 20d. The pressure of the lean liquid 5 supplied to the first spray 21b is increased by a lean liquid pump 34.

In the absorption column container 20c, a first washer 21, a second washer 22, and demisters 81 and 82 which will be described later are housed together with the carbon dioxide capture packed bed 20d. The absorption column container 20c is configured to receive the combustion exhaust gas 2 from the lower portion of the absorption column container 20c and discharge the combustion exhaust gas 2 as the decarbonated combustion exhaust gas 3 described later from the top of the absorption column container 20c.

The combustion exhaust gas 2 containing carbon dioxide discharged from the outside of the carbon dioxide capture system 1 such as the boiler described above is supplied to a lower portion of the absorption column 20 by a blower (not illustrated). The supplied combustion exhaust gas 2 rises toward the carbon dioxide capture packed bed 20d of the carbon dioxide capturer 20a in the absorption column 20. On the other hand, the lean liquid 5 from the regeneration column 30 is sprayed from the first spray 21b. As a result, the mist of the lean liquid 5 drops and is supplied to the carbon dioxide capture packed bed 20d. For this reason, the lean liquid 5 flows down on the surface of the internal structure of the carbon dioxide capture packed bed 20d. In the carbon dioxide capture packed bed 20d, the combustion exhaust gas 2 and the lean liquid 5 come into gas-liquid contact, and the carbon dioxide contained in the combustion exhaust gas 2 is absorbed into the lean liquid 5 to generate the rich liquid 4.

The generated rich liquid 4 is once stored in the lower portion of the absorption column container 20c and is discharged from the lower portion to the rich liquid line 15. The combustion exhaust gas 2 subjected to gas-liquid contact with the lean liquid 5 is subjected to removal of carbon dioxide, and further rises as the decarbonated combustion exhaust gas 3 from the carbon dioxide capture packed bed 20d in the absorption column 20.

A heat exchanger 31 is arranged between the absorption column 20 and the regeneration column 30. The rich liquid line 15 and the lean liquid line 16 described above pass through the heat exchanger 31. A rich liquid pump 32 is arranged in the rich liquid line 15, and the rich liquid 4 discharged from the absorption column 20 is supplied to the regeneration column 30 through the heat exchanger 31 by the rich liquid pump 32. The heat exchanger 31 exchanges heat between the rich liquid 4 supplied from the absorption column 20 to the regeneration column 30 and the lean liquid 5 supplied from the regeneration column 30 to the absorption column 20. As a result, the lean liquid 5 serves as a heat source, and the rich liquid 4 is heated to a desired temperature. In other words, the rich liquid 4 serves as a cold heat source, and the lean liquid 5 is cooled to a desired temperature.

The regeneration column 30 includes an amine regenerator 30a (absorbing liquid regenerator), a liquid diffuser 30b arranged above the amine regenerator 30a, and a regeneration column container 30c that houses the amine regenerator 30a and the liquid diffuser 30b.

The amine regenerator 30a is configured as a countercurrent gas-liquid contact device. As an example, the amine regenerator 30a includes an amine regeneration packed bed 30d. The amine regeneration packed bed 30d is configured by an internal structure such as packing or particles filled inside to increase the gas-liquid contact area. While the rich liquid 4 supplied from the absorption column 20 flows down on the surface of the internal structure, the rich liquid 4 is brought into gas-liquid contact with a vapor 7 described later, and the carbon dioxide is released from the rich liquid 4. Accordingly, the carbon dioxide is captured (or removed) from the rich liquid 4.

The liquid diffuser 30b is configured to diffuse and drop the rich liquid 4 toward the amine regenerator 30a. The rich liquid 4 is supplied to the surface of the internal structure of the amine regeneration packed bed 30d. The pressure of the rich liquid 4 supplied to the liquid diffuser 30b is a pressure that is not so high as compared with the inner pressure of the regeneration column 30, and the liquid diffuser 30b drops the rich liquid 4 to the amine regenerator 30a substantially by the action of gravity rather than force.

In the regeneration column container 30c, a regeneration washer 37 and demisters 86 and 87 which will be described later are housed together with the amine regeneration packed bed 30d and the liquid diffuser 30b. The regeneration column container 30c is configured to discharge the carbon dioxide-containing gas 8 released from the rich liquid 4 from the top of the regeneration column container 30c.

The reboiler 33 is connected to the regeneration column 30. The reboiler 33 heats the lean liquid 5 supplied from the regeneration column 30 by the heating medium 6 to generate the vapor 7, and supplies the generated vapor 7 to the regeneration column 30. More specifically, a part of the lean liquid 5 discharged from the lower portion of the regeneration column 30 is supplied to the reboiler 33, and a high-temperature vapor serving as the heating medium 6 is supplied from the outside such as a turbine (not illustrated) or the like. The lean liquid 5 supplied to the reboiler 33 is heated by exchanging heat with the heating medium 6, and the vapor 7 is generated from the lean liquid 5. The generated vapor 7 is supplied to the lower portion of the regeneration column 30 and heats the lean liquid 5 in the regeneration column 30. Incidentally, the heating medium 6 supplied to the reboiler 33 is not limited to high-temperature vapor from the turbine.

The vapor 7 is supplied from the reboiler 33 to the lower portion of the regeneration column 30, and rises toward the amine regeneration packed bed 30d of the amine regenerator 30a in the regeneration column 30. On the other hand, the rich liquid 4 from the absorption column 20 is supplied to the liquid diffuser 30b and drops from the liquid diffuser 30b. The rich liquid 4, then, is supplied to the amine regeneration packed bed 30d to flow down on the surface of the internal structure of the amine regeneration packed bed 30d. In the amine regeneration packed bed 30d, the rich liquid 4 and the vapor 7 come into gas-liquid contact, and the carbon dioxide gas is released from the rich liquid 4 to generate the lean liquid 5. In this way, the absorbing liquid is regenerated in the regeneration column 30.

The generated lean liquid 5 is discharged from the lower portion of the regeneration column 30 to the lean liquid line 16. The vapor 7 subjected to gas-liquid contact with the rich liquid 4 is accompanied by carbon dioxide and is discharged from the top of the regeneration column 30 as the carbon dioxide-containing gas 8. The discharged carbon dioxide-containing gas 8 also contains vapors.

The lean liquid pump 34 is arranged in the lean liquid line 16. The lean liquid 5 discharged from the regeneration column 30 is supplied to the absorption column 20 through the above-described heat exchanger 31 by the lean liquid pump 34. As described above, the heat exchanger 31 cools the lean liquid 5 supplied from the regeneration column 30 to the absorption column 20 by exchanging heat with the rich liquid 4 supplied from the absorption column 20 to the regeneration column 30. Further, the lean liquid line 16 is arranged with a lean liquid cooler 35 (absorbing liquid cooler) that cools the lean liquid 5 supplied from the regeneration column 30 to the carbon dioxide capturer 20a. In the lean liquid cooler 35, a cooling medium such as cooling water (for example, cooling water of a cooling tower or seawater) is supplied from the outside, and the lean liquid 5 cooled in the heat exchanger 31 is further cooled to a desired temperature.

The lean liquid 5 cooled in the lean liquid cooler 35 is supplied as the first cleaning liquid 11 to the first spray 21b of the absorption column 20. The mist of the first cleaning liquid 11 drops from the first spray 21b and passes through a first washing-capturing space 21a described later. The mist of the first cleaning liquid 11 is supplied as the lean liquid 5 to the carbon dioxide capture packed bed 20d of the carbon dioxide capturer 20a to flow down on the surface of the internal structure of the carbon dioxide capture packed bed 20d. In the carbon dioxide capture packed bed 20d, the lean liquid 5 comes into gas-liquid contact with the combustion exhaust gas 2. As a result, the lean liquid 5 becomes the rich liquid 4 by absorbing the carbon dioxide contained in the combustion exhaust gas 2. In this way, in the carbon dioxide capture system 1, the absorbing liquid circulates while repeatedly becoming the state of the lean liquid 5 and the state of the rich liquid 4.

The carbon dioxide capture system 1 illustrated in FIG. 1 includes a gas cooler 40 that cools the carbon dioxide-containing gas 8 discharged from the top of the regeneration column 30 to condense vapors to generate condensed water 9 and a gas-liquid separator 41 that separates the condensed water 9 generated by the gas cooler 40 from the carbon dioxide-containing gas 8. In this way, the amount of the water contained in the carbon dioxide-containing gas 8 is reduced, and the carbon dioxide-containing gas 8 is discharged as the carbon dioxide gas 10 from the gas-liquid separator 41. The discharged carbon dioxide gas 10 is supplied to equipment (not illustrated) and stored. On the other hand, the condensed water 9 separated in the gas-liquid separator 41 is supplied to the regeneration column 30 by the condensed water pump 42 and mixed with the absorbing liquid. Incidentally, the gas cooler 40 is externally supplied with a cooling medium (for example, cooling water of a cooling tower or seawater) for cooling the carbon dioxide-containing gas 8.

Incidentally, in the absorption column 20, the first washer 21 and the second washer 22 are housed. Among them, the first washer 21 washes the decarbonated combustion exhaust gas 3 discharged from the carbon dioxide capturer 20a with the mist of the first cleaning liquid 11 and captures the amine as an absorbing liquid component accompanying the decarbonated combustion exhaust gas 3. The first washer 21 is arranged above the carbon dioxide capturer 20a.

The first washer 21 includes the first washing-capturing space 21a and the first spray 21b arranged above the first washing-capturing space 21a.

The first washing-capturing space 21a is a space arranged below the first spray 21b. The first washing-capturing space 21a in this embodiment is a space arranged from the first spray 21b to the carbon dioxide capturer 20a. The first cleaning liquid 11 is sprayed from the first spray 21b into the first washing-capturing space 21a. The sprayed first cleaning liquid 11 comes into contact with the rising decarbonated combustion exhaust gas 3 while freely dropping in a mist state in the first washing-capturing space 21a (that is, dropping without contacting the surface of a structure or the like in the space). Accordingly, the amine accompanying the decarbonated combustion exhaust gas 3 is captured. In the first washer 21, the mist-like amine can be effectively captured, and the gaseous amine can also be effectively captured.

In this embodiment, as described above, the first washing-capturing space 21a is formed between the first spray 21b and the carbon dioxide capturer 20a. The first washing-capturing space 21a is not provided with a structure such as a packed bed or a shelf for bringing the first cleaning liquid 11 into contact with the decarbonated combustion exhaust gas 3 while flowing down on the surface. The first spray 21b faces the carbon dioxide capturer 20a via the first washing-capturing space 21a. That is, a structure or the like in which the first cleaning liquid 11 flows down on the surface is not provided between the first spray 21b and the carbon dioxide capturer 20a, and the first washing-capturing space 21a is formed from the first spray 21b to the carbon dioxide capturer 20a. As a result, the first washing-capturing space 21a is configured such that the first cleaning liquid 11 comes into contact with the decarbonated combustion exhaust gas 3 while dropping freely. The mist of the first cleaning liquid 11 sprayed from the first spray 21b drops in the first washing-capturing space 21a where the decarbonated combustion exhaust gas 3 rises, and directly reaches the carbon dioxide capturer 20a. That is, the first cleaning liquid 11 that passes through the first washing-capturing space 21a directly reaches the carbon dioxide capturer 20a. While dropping, the first cleaning liquid 11 comes into contact with the decarbonated combustion exhaust gas 3, and the mist-like amine accompanying the decarbonated combustion exhaust gas 3 physically collides with the mist of the first cleaning liquid 11 and is captured.

The first spray 21b sprays and drops the first cleaning liquid 11 toward the first washing-capturing space 21a. The first spray 21b includes a plurality of spray nozzle holes (not illustrated), and sprays the first cleaning liquid 11 supplied at an increased pressure by a first circulation pump 51 described later from the spray nozzle holes. Accordingly, the first cleaning liquid 11 is turned into a mist and is sprayed at a high speed from the first spray 21b, and drops freely while being evenly distributed in the first washing-capturing space 21a. That is, the first spray 21b applies a first vertical initial velocity as a vertical velocity component to the first cleaning liquid 11, so as to forcibly drop (spray) freely with the vertical velocity component in the first washing-capturing space 21a.

Figure 3:
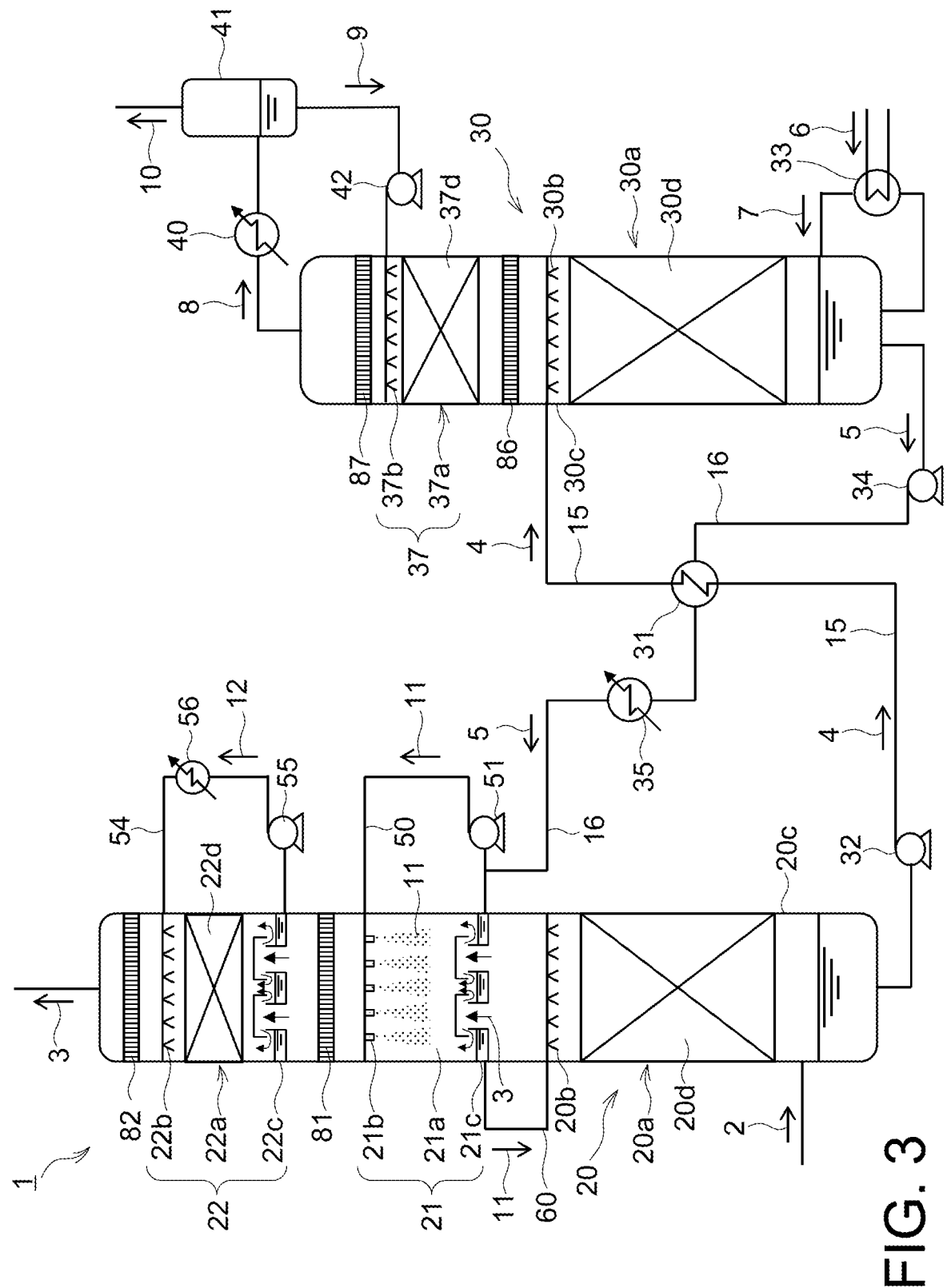
FIG. 3 is a diagram illustrating an overall configuration of a carbon dioxide capture system according to a second embodiment of the present invention.

In this embodiment, a first receiver 21c as illustrated in FIG. 3 and the like to be described later is not provided. The first spray 21b faces the carbon dioxide capturer 20a via the first washing-capturing space 21a. The mist of the first cleaning liquid 11 sprayed from the first spray 21b drops in the first washing-capturing space 21a and reaches the carbon dioxide capturer 20a.

The second washer 22 washes the decarbonated combustion exhaust gas 3 discharged from the first washer 21 with a second cleaning liquid 12 (or second washing water), and captures the amine accompanying the decarbonated combustion exhaust gas 3. The second washer 22 is arranged above the first washer 21.

The second washer 22 includes a washing capturer 22a, a cleaning liquid diffuser 22b arranged above the washing capturer 22a, and a second receiver 22c arranged below the washing capturer 22a.

The washing capturer 22a is configured as a countercurrent gas-liquid contact device. As an example, the washing capturer 22a includes a washing capture packed bed 22d. The washing capture packed bed 22d is configured by an internal structure such as packing or particles filled inside to increase the gas-liquid contact area. The second cleaning liquid 12 is brought into gas-liquid contact with the decarbonated combustion exhaust gas 3 while flowing down on the surface of the internal structure, so as to capture (or remove) the amine accompanying the decarbonated combustion exhaust gas 3. In the second washer 22, the gaseous amine can be effectively captured, and the mist-like amine can also be effectively captured.

The cleaning liquid diffuser 22b is configured to diffuse and drop the second cleaning liquid 12 toward the washing capturer 22a. The second cleaning liquid 12 is supplied to flow down on the surface of the internal structure of the washing capturer 22a. The pressure of the second cleaning liquid 12 supplied to the cleaning liquid diffuser 22b is lower than the pressure of the first cleaning liquid 11 supplied to the first spray 21b. The pressure of the second cleaning liquid 12 supplied to the cleaning liquid diffuser 22b is not so high as the pressure in the absorption column 20. The second vertical initial velocity, which is a vertical velocity component which the cleaning liquid diffuser 22b applies to the second cleaning liquid 12, is smaller than the first vertical initial velocity which is a vertical velocity component which the first spray 21b of the first washer 21 applies to the first cleaning liquid 11. The second vertical initial velocity applied to the second cleaning liquid 12 is substantially zero, and the cleaning liquid diffuser 22b causes the second cleaning liquid 12 to drop freely in the washing capturer 22a non-forcibly by the action of gravity.

The second receiver 22c is configured to receive and store the second cleaning liquid 12 which flows down on the surface of the internal structure of the washing capturer 22a and to allow and the decarbonated combustion exhaust gas 3 which is discharged from the first washing-capturing space 21a of the first washer 21 and rises to pass therethrough. That is, the second receiver 22c includes a receiver body which receives and stores the second cleaning liquid 12, an opening which is arranged between the receiver bodies and allows the decarbonated combustion exhaust gas 3 to pass therethrough, and a cover which covers the opening from above and suppresses the second cleaning liquid 12 from passing through the opening.

A second circulation line 54 which circulates the second cleaning liquid 12 is connected to the second washer 22. That is, a second circulation pump 55 is arranged in the second circulation line 54, and extracts the second cleaning liquid 12 stored in the second receiver 22c and supplies the second cleaning liquid 12 to the cleaning liquid diffuser 22b. In this way, the second cleaning liquid 12 is circulated.

In this embodiment, a second cleaning liquid cooler 56 which cools the second cleaning liquid 12 is arranged in the second circulation line 54. The second cleaning liquid cooler 56 is supplied with a cooling medium (for example, cooling water of a cooling tower or seawater) from the outside of the carbon dioxide capture system 1 as a cooling medium for cooling the second cleaning liquid 12. In this way, the second cleaning liquid cooler 56 is configured to cool the second cleaning liquid 12 flowing through the second circulation line 54, and the temperature of the second cleaning liquid 12 is lower than the temperature of the first cleaning liquid 11. However, the temperature of the second cleaning liquid 12 and the temperature of the first cleaning liquid 11 may be configured to be substantially equal.

A first washer exit demister 81 is arranged between the first washer 21 and the second washer 22. The first washer exit demister 81 is arranged between the first washer 21 and the second washer 22 (more specifically, between the first spray 21b and the second receiver 22c). As a result, the decarbonated combustion exhaust gas 3 discharged from the first washer 21 passes through the first washer exit demister 81 and rises. The first washer exit demister 81 traps the mist accompanying the passing decarbonated combustion exhaust gas 3. The first washer exit demister 81 can effectively trap the mist-like amine and the mist of the first cleaning liquid 11.

The second washer exit demister 82 is arranged above the second washer 22. The second washer exit demister 82 is arranged above the second washer 22 (more specifically, between the cleaning liquid diffuser 22b and the top of the absorption column container 20c). As a result, the decarbonated combustion exhaust gas 3 discharged from the second washer 22 passes through the second washer exit demister 82 and rises. The second washer exit demister 82 traps the mist accompanying the passing decarbonated combustion exhaust gas 3. The second washer exit demister 82 can effectively trap the mist-like amine and the mist of the second cleaning liquid 12. In addition, since the second cleaning liquid 12 adheres to the second washer exit demister 82, the second washer exit demister 82 can also trap the gaseous amine.

In this embodiment, the washing capture packed bed 22d of the second washer 22 may be configured to so that the pressure loss generated in the flow of the decarbonated combustion exhaust gas 3 passing through the washing capture packed bed 22d can be lower than the pressure loss generated in the flow in the second washer exit demister 82. For example, the porosity of the washing capture packed bed 22d may be larger than the porosity of the second washer exit demister 82. In other words, the specific surface area of the washing capture packed bed 22d may be smaller than the specific surface area of the second washer exit demister 82.

As illustrated in FIG. 1, no demister is provided between the carbon dioxide capturer 20a and the first washer 21. In general, a demister is often arranged between the carbon dioxide capturer 20a and the first washer 21. However, in this embodiment, the first cleaning liquid 11 is formed of the lean liquid 5, and the difference between the amine concentration of the lean liquid 5 in the carbon dioxide capturer 20a and the amine concentration of the first cleaning liquid 11 in the first washer 21 is small. For this reason, no demister is provided between the carbon dioxide capturer 20a and the first washer 21 for the purpose of reducing the pressure loss with respect to the flow of the decarbonated combustion exhaust gas 3.

Incidentally, the flow rate (first flow rate) per unit area and unit time of the first cleaning liquid 11 sprayed from the first spray 21b of the first washer 21 is larger than the flow rate (second flow rate) per unit area and unit time of the second cleaning liquid 12 diffused from the cleaning liquid diffuser 22b of the second washer 22. The flow rate of the first cleaning liquid 11 sprayed from the first spray 21b is adjusted by the above-described first circulation pump 51 (flow rate adjuster). Similarly, the flow rate of the second cleaning liquid 12 diffused from the cleaning liquid diffuser 22b is adjusted by the above-described second circulation pump 55.

Incidentally, the unit area described here is a unit area with respect to the horizontal cross-sectional area where the first spray 21b sprays the first cleaning liquid 11 (or the horizontal cross-sectional area of the first washer 21) and the horizontal cross-sectional area where the cleaning liquid diffuser 22b diffuses the second cleaning liquid 12 (or the horizontal cross-sectional area of the second washer 22). In this embodiment, the horizontal cross-sectional areas of the first washer 21 and the second washer 22 are substantially equal, and thus the first flow rate and the second flow rate may be set on the basis of the flow rate per unit time without consideration of the difference between the horizontal cross-sectional areas of the washers (the first washer 21 and the second washer 22).

When generalization is made to include a case where the horizontal cross-sectional areas of the washers 21 and 22 are different, for example, the flow rate (first flow rate) per unit area and unit time of the first cleaning liquid 11 sprayed from the first spray 21*b* may be 200 L/min/m$^2$ or more or may be 300 L/min/m$^2$ or more. The flow rate (second flow rate) per unit area and unit time of the second cleaning liquid 12 diffused from the cleaning liquid diffuser 22*b* may be 50 L/min/m$^2$ to 150 L/min/m$^2$ (the normal flow rate range illustrated in FIG. 2).

The second cleaning liquid 12 diffused from the cleaning liquid diffuser 22*b* comes into gas-liquid contact with the decarbonated combustion exhaust gas 3 while flowing down on the surface of the internal structure forming the washing capture packed bed 22*d*. For this reason, even if the flow rate of the second cleaning liquid 12 per unit area and unit time is larger than 150 L/min/m$^2$, the contribution to the improvement of the washing efficiency of the decarbonated combustion exhaust gas 3 is limited. Further, increasing the flow rate of the second cleaning liquid 12 more than necessary increases the capacity of the second circulation pump 55 and increases the operating cost, which is not preferable. However, in the first washer 21, the first cleaning liquid 11 sprayed from the first spray 21*b* is brought into contact with the decarbonated combustion exhaust gas 3 in a mist state without providing a member such as a packed bed. Increasing the flow rate per unit area and unit time of the first cleaning liquid 11 can contribute to increasing the probability of physical collision with the mist-like amine accompanying the decarbonated combustion exhaust gas 3 and can improve the washing efficiency of the decarbonated combustion exhaust gas 3. This is illustrated in FIG. 2.

Figure 2:
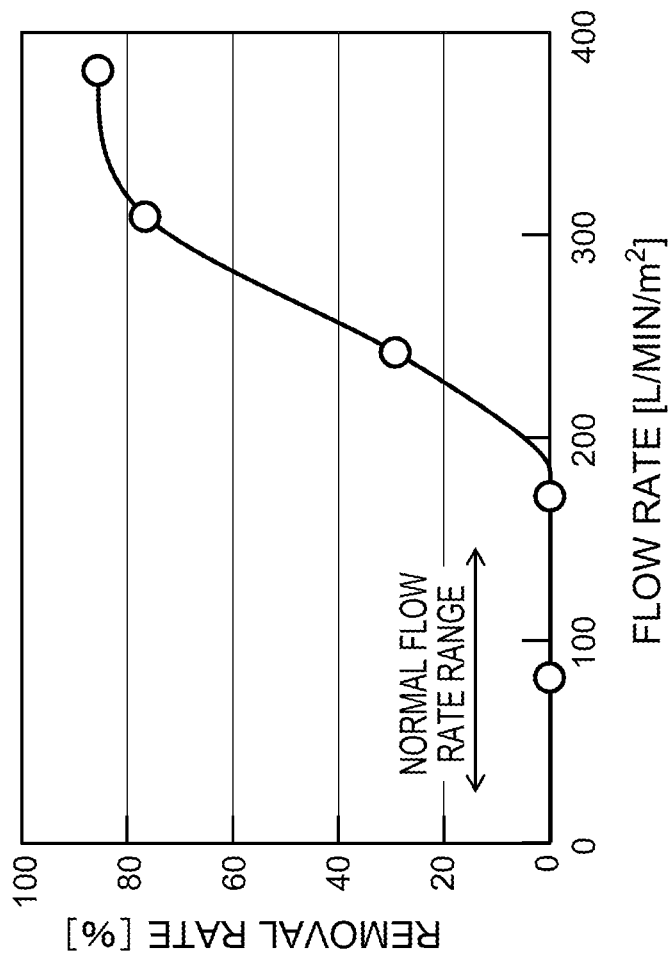
FIG. 2 is a graph illustrating a relationship between a flow rate of a first cleaning liquid and a removal rate of mist-like amine in the carbon dioxide capture system illustrated in FIG. 1.

FIG. 2 is a graph illustrating a relationship between the flow rate of the first cleaning liquid 11 and the mist-like amine removal rate (capture efficiency). This data is obtained under the following test conditions.

Inner diameter of test device (corresponding to the inner diameter of the part where the first washer 21 is arranged in the absorption column container 20*c*) . . . 157 mm Flow rate of treatment gas (corresponding to the flow rate of the decarbonated combustion exhaust gas 3) . . . 0.7 m/s Concentration of mist-like amine droplets (particle size 0.61 µm to 0.95 µm) . . . about 10,000/cc Mean particle size of cleaning liquid mist: about 300 µm Pressure of cleaning liquid . . . 0.2 MPa As illustrated in FIG. 2, the removal rate of the mist-like amine is low in the normal flow rate range of the second cleaning liquid 12, but the removal rate increases beyond this range. When the flow rate is 300 L/min/m$^2$ or more, a significant removal effect is exhibited, and when the flow rate is 300 L/min/m$^2$ or more, the removal effect can be enhanced. When the flow rate is 300 L/min/m$^2$ or more, the removal rate exceeds 70%, and the removal rate of mist-like amine can be increased.

As illustrated in FIG. 1, the regeneration column 30 includes the regeneration washer 37 configured to wash the carbon dioxide-containing gas 8 discharged from the above-described amine regenerator 30*a* with the condensed water 9 and captures the amine accompanying the carbon dioxide-containing gas 8. The regeneration washer 37 is arranged above the amine regenerator 30*a*.

The regeneration washer 37 includes a regeneration column capturer 37*a* and a liquid diffuser 37*b* arranged above the regeneration column capturer 37*a*.

The regeneration column capturer 37*a* is configured as a countercurrent gas-liquid contact device. As an example, the regeneration column capturer 37*a* includes a regeneration column capture packed bed 37*d*. The regeneration column capture packed bed 37*d* is configured by an internal structure such as packing or particles filled inside to increase the gas-liquid contact area. The condensed water 9 is brought into gas-liquid contact with the carbon dioxide-containing gas 8 while flowing down on the surface of the internal structure, so as to capture (or remove) the amine from the carbon dioxide-containing gas 8.

The liquid diffuser 37*b* is configured to diffuse and drop the condensed water 9 toward the regeneration column capturer 37*a*. The condensed water 9 is supplied to the surface of the internal structure of the regeneration column capture packed bed 37*d*. The pressure of the condensed water 9 supplied to the liquid diffuser 37*b* is a pressure that is not so high as compared with the inner pressure of the regeneration column 30, and the liquid diffuser 37*b* drops the condensed water 9 to the regeneration column capture packed bed 37*d* substantially by the action of gravity rather than force.

Incidentally, the first regeneration column demister 86 is arranged above the amine regenerator 30*a* of the regeneration column 30. The first regeneration column demister 86 is arranged between the amine regenerator 30*a* and the regeneration washer 37 (more specifically, between the liquid diffuser 30*b* and the regeneration column capturer 37*a*). As a result, the carbon dioxide-containing gas 8 discharged from the amine regenerator 30*a* passes through the first regeneration column demister 86 and rises. The first regeneration column demister 86 traps the mist accompanying the passing carbon dioxide-containing gas 8. The first regeneration column demister 86 can effectively trap the mist-like amine. In addition, since the condensed water 9 dropping from the liquid diffuser 37*b* adheres to the first regeneration column demister 86, the first regeneration column demister 86 can also trap the gaseous amine.

The second regeneration column demister 87 is arranged above the regeneration washer 37. The second regeneration column demister 87 is arranged above the liquid diffuser 37*b* of the regeneration washer 37 (more specifically, between the liquid diffuser 37*b* and the top of the regeneration column container 30*c*). As a result, the carbon dioxide-containing gas 8 discharged from the regeneration washer 37 passes through the second regeneration column demister 87 and rises. The second regeneration column demister 87 can effectively trap the mist-like amine and the mist of the condensed water 9 accompanying the passing carbon dioxide-containing gas 8. In addition, since the condensed water 9 adheres to the second regeneration column demister 87, the second regeneration column demister 87 can also trap the gaseous amine.

Next, an action of this embodiment having such a configuration, that is, an operation method of the carbon dioxide capture system will be described.

During the operation of the carbon dioxide capture system illustrated in FIG. 1, in the carbon dioxide capture packed bed 20*d* of the carbon dioxide capturer 20*a* of the absorption column 20, the lean liquid 5 supplied from the lean liquid cooler 35 is sprayed as the first cleaning liquid 11 from the first spray 21*b* and drops in the first washing-capturing space 21*a*. The first cleaning liquid 11 that passes through the first washing-capturing space 21*a* reaches the carbon dioxide capturer 20*a*. Then, as the lean liquid 5, the first cleaning liquid 11 comes into gas-liquid contact with the combustion exhaust gas 2 while flowing down on the surface of the internal structure of the carbon dioxide capture packed bed 20*d*. The carbon dioxide contained in the combustion exhaust gas 2 is absorbed into the lean liquid 5. The combustion exhaust gas 2 is discharged from the carbon dioxide capturer 20*a* as the decarbonated combustion exhaust gas 3.

The decarbonated combustion exhaust gas 3 that passes through the carbon dioxide capturer 20*a* reaches the first washing-capturing space 21*a* of the first washer 21.

As described above, the first cleaning liquid 11 sprayed from the spray nozzle hole of the first spray 21*b* drops in the first washing-capturing space 21*a* and directly reaches the carbon dioxide capturer 20*a*. During this time, the first cleaning liquid 11 physically collides with the decarbonated combustion exhaust gas 3 while dropping in a mist state, and the decarbonated combustion exhaust gas 3 is washed with the first cleaning liquid 11. As a result, the mist-like amine accompanying the decarbonated combustion exhaust gas 3 is effectively captured in the first cleaning liquid 11.

As illustrated in FIG. 1, the decarbonated combustion exhaust gas 3 washed with the first cleaning liquid 11 is discharged from the first washing-capturing space 21*a* of the first washer 21. Then, the decarbonated combustion exhaust gas 3 further rises in the second washer 22 and passes through the second washer exit demister 82. At this time, the mist-like amine and the mist of the first cleaning liquid 11 accompanying the decarbonated combustion exhaust gas 3, and the like are trapped by the second washer exit demister 82.

The decarbonated combustion exhaust gas 3 that passes through the second washer exit demister 82 is discharged to the atmosphere from the top of the absorption column container 20*c*.

Here, a general problem occurring when the decarbonated combustion exhaust gas 3 is washed in the carbon dioxide capture system 1 will be described.

In general, in the carbon dioxide capture system 1, in order to capture the amine accompanying the decarbonated combustion exhaust gas 3, a packed bed or a shelf for a cleaning liquid flowing down on the surface is arranged in some cases. In this case, the contact area between the decarbonated combustion exhaust gas 3 and the cleaning liquid increases, and the amine can be effectively captured.

The amine accompanying the decarbonated combustion exhaust gas 3 is roughly classified into the gaseous amine and the mist-like amine. Among them, the gaseous amine is easily captured by washing using a cleaning liquid, a packed bed, and the like. On the other hand, the mist-like amine is hardly captured by washing using a cleaning liquid, a packed bed, and the like. The mist-like amine is easily trapped by the demister. However, when the particle size of the mist is 5 μm or less, it is difficult to trap the mist-like amine by the demister. In order to improve the removal rate of the mist-like amine having a particle size of 5 μm or less, it is conceivable to use a high-density demister. However, the high-density demister may increase the pressure loss generated in the flow of the decarbonated combustion exhaust gas 3 passing therethrough. In this case, the power of the blower that supplies the combustion exhaust gas 2 to the absorption column 20 is increased, and the operating cost is increased. Further, in a case where a high-density demister is used, a problem that clogging of the demister may occur is also considered.

In this regard, in this embodiment, the removal rate (capture efficiency) of the mist-like amine is improved by turning the cleaning liquid into a mist. That is, in this embodiment, the pressure of the first cleaning liquid 11 supplied to the first spray 21*b* of the first washer 21 is increased, and the first cleaning liquid 11 is sprayed from the spray nozzle hole of the first spray 21*b* (particularly immediately after the spray) at high speed. As a result, the mist of the first cleaning liquid 11 physically collides with the mist-like amine accompanying the decarbonated combustion exhaust gas 3, and the mist-like amine is trapped to be captured by the mist of the first cleaning liquid 11. The first cleaning liquid 11 capturing the mist-like amine drops into the carbon dioxide capturer 20*a*. In this way, the mist-like amine that is hardly trapped in cleaning using a cleaning liquid, a packed bed, or the like, is captured into the first cleaning liquid 11, and the decarbonated combustion exhaust gas 3 is washed effectively. Further, it is possible to avoid the problem of pressure loss that occurs at the time of using a high-density demister as described above.

Here, as a general cleaning liquid, pure water may be used instead of the absorbing liquids 4 and 5. In this case, the amine concentration of the cleaning liquid is low, and even when the amine is trapped, the amine concentration of the cleaning liquid is lower than the amine concentrations of the absorbing liquids 4 and 5. Therefore, there is a problem that it is difficult to use such a cleaning liquid as an absorbing liquid. In order to increase the amine concentration, it is conceivable to perform a distillation treatment of the cleaning liquid or a concentration treatment using a membrane. However, in this case, there is a problem that energy consumption increases.

On the other hand, in this embodiment, the lean liquid 5 is used for the first cleaning liquid 11, and the lean liquid 5 is sprayed from the first spray 21*b*. The mist of the lean liquid 5 sprayed from the first spray 21*b* physically collides with the mist-like amine accompanying the decarbonated combustion exhaust gas 3. As a result, the mist-like amine can be effectively trapped by the mist of the lean liquid 5. The lean liquid 5 that traps the mist-like amine is supplied to the carbon dioxide capturer 20*a* and used as an absorbing liquid.

In this embodiment, the first cleaning liquid 11 with increased pressure is supplied to the first spray 21*b* of the first washer 21, and the first cleaning liquid 11 is sprayed from the first spray 21*b*. As a result, a mist of the first cleaning liquid 11 can be formed, and the washing efficiency of the first washer 21 can be improved. For example, when the mist of the first cleaning liquid 11 is formed using ultrasonic vibration energy, the first cleaning liquid 11 becomes in a finely atomized spray state, and a sufficient velocity component in the vertical direction may be difficult to be given to the mist of the first cleaning liquid 11. Further, when ultrasonic vibration energy is used, the pressure of the first cleaning liquid 11 is 0.1 MPa or less as described later. Thus, also in this point, a sufficient velocity component in the vertical direction may be difficult to be given to the mist of the first cleaning liquid 11. On the other hand, in this embodiment, as described later, the pressure of the first cleaning liquid 11 supplied to the first spray 21*b* is increased to, for example, 0.1 MPa to 1.0 MPa. Thus, the first cleaning liquid 11 can be sprayed at high speed to be turned into a mist, and the washing efficiency of the first washer 21 can be improved.

As described above, the first cleaning liquid 11 sprayed from the first spray 21*b* drops freely in the first washing-capturing space 21*a* which is not provided with the packed bed or the like without contacting the surface of the structure or the like. In this case, the mist of the first cleaning liquid 11 directly reaches the carbon dioxide capturer 20a without colliding with a member such as a structure, and thus, the mist of the first cleaning liquid 11 can be suppressed from being made fine.

That is, in a case where a capturer (the washing capturer 22a illustrated in FIG. 3 described later) configured by a packed bed or the like is included similarly to the first washer 21 or a second washer 22, the mist of the first cleaning liquid 11 sprayed at high speed from the first spray 21b collides with the packed bed and the like to be made fine. In this case, the particle size of the mist of the first cleaning liquid 11 becomes small, and the mist easily flows back along with the decarbonated combustion exhaust gas 3. For this reason, the first cleaning liquid 11 capturing the amine is discharged into the atmosphere along with the decarbonated combustion exhaust gas 3, and the amount of the amine discharged into the atmosphere may increase, which is problematic.

However, in this embodiment, the first washing-capturing space 21a is formed below the first spray 21b, and no member such as a structure such as a packed bed is provided. For this reason, the mist of the first cleaning liquid 11 can be suppressed from being made fine, and the decrease in the washing efficiency of the first washer 21 can be suppressed. For example, by setting the distance from the first spray 21b to the carbon dioxide capture packed bed 20d to at least 1 m or more, preferably 1.5 m or more, a sufficient first washing-capturing space 21a can be provided. In this case, when the mist of the first cleaning liquid 11 reaches the carbon dioxide capture packed bed 20d, the speed can be reduced, and it is possible to suppress that the mist collides with the carbon dioxide capture packed bed 20d to be made fine. Further, in order to suppress that the sprayed mist of the first cleaning liquid 11 accompanies the decarbonated combustion exhaust gas 3, the distance from the first spray 21b to the carbon dioxide capture packed bed 20d may be set to 5 m or less.

As described above, according to this embodiment, the decarbonated combustion exhaust gas 3 discharged from the carbon dioxide capturer 20a is washed with the first cleaning liquid 11 sprayed by the first spray 21b of the first washer 21, and the amine accompanying the decarbonated combustion exhaust gas 3 is captured. As a result, the first cleaning liquid 11 can be turned into a mist, and the mist of the first cleaning liquid 11 can physically collides with the mist-like amine accompanying the decarbonated combustion exhaust gas 3 discharged from the carbon dioxide capturer 20a. For this reason, the mist-like amine can be effectively captured into the first cleaning liquid 11, and the washing efficiency of the decarbonated combustion exhaust gas 3 can be improved. As a result, the amount of amine discharged to the atmosphere can be reduced, and the amount of amine discharged to the outside of the carbon dioxide capture system 1 can be reduced.

Further, according to this embodiment, the lean liquid line 16 can supply the lean liquid 5 discharged from the amine regenerator 30a of the regeneration column 30 as the first cleaning liquid 11 to the first spray 21b. As a result, the first cleaning liquid 11 using the lean liquid 5 can be sprayed from the first spray 21b, and the mist of the first cleaning liquid 11 can be brought into physical collision with the mist-like amine accompanying the decarbonated combustion exhaust gas 3. For this reason, the mist-like amine can be trapped by the lean liquid 5 without using a liquid different from the lean liquid 5 such as washing water. The trapped amine is contained in the lean liquid 5 and can be used as an absorbing liquid. As a result, the amine captured from the decarbonated combustion exhaust gas 3 can be easily used.

Further, according to this embodiment, the first washer 21 has the first washing-capturing space 21a in which the mist of the first cleaning liquid 11 sprayed from the first spray 21b comes into contact with the decarbonated combustion exhaust gas 3 while freely dropping. As a result, it is possible to suppress that the mist of the first cleaning liquid 11 sprayed from the first spray 21b collides with a member such as a structure. For this reason, it is possible to suppress that the mist of the first cleaning liquid 11 is made fine to accompany the decarbonated combustion exhaust gas 3.

According to this embodiment, the first spray 21b faces the carbon dioxide capturer 20a. As a result, the mist of the first cleaning liquid 11 sprayed from the first spray 21b can pass through the first washing-capturing space 21a and reach the carbon dioxide capturer 20a. Then, the first cleaning liquid 11 can be supplied as the lean liquid 5 to the carbon dioxide capturer 20a. For this reason, the decarbonated combustion exhaust gas 3 discharged from the carbon dioxide capturer 20a can be washed with the lean liquid 5 without using a liquid different from the lean liquid 5 such as washing water. In this case, the configuration of a first circulation line 50 and the like illustrated in FIG. 3 and the like can be made unnecessary. As a result, the configuration from the carbon dioxide capturer 20a to the first washer 21 can be simplified.

Incidentally, in the above-described embodiment, an example has been described in which the carbon dioxide capturer 20a includes the carbon dioxide capture packed bed 20d. However, the present invention is not limited to this, and the carbon dioxide capturer 20a may be configured by a shelf (not illustrated). The same applies to the washing capturer 22a, the amine regenerator 30a, and the regeneration column capturer 37a.

Second Embodiment

Next, a carbon dioxide capture system and a method of operating the carbon dioxide capture system according to a second embodiment of the present invention will be described with reference to FIG. 3.

The second embodiment illustrated in FIG. 3 is mainly different in that the absorbing liquid line is connected to the first circulation line that supplies the first cleaning liquid in the first receiver to the first spray, and other configurations are substantially the same as those of the first embodiment illustrated in FIGS. 1 and 2. Incidentally, in FIG. 3, the same parts as those in the first embodiment illustrated in FIGS. 1 and 2 are denoted by the same reference numerals, and detailed description will be omitted.

In this embodiment, as illustrated in FIG. 3, the first washer 21 further includes the first receiver 21c arranged below the first washing-capturing space 21a. The first washing-capturing space 21a is formed from the first spray 21b to the carbon dioxide capturer 20a. The mist of the first cleaning liquid 11 sprayed from the first spray 21b drops in the first washing-capturing space 21a, and directly reaches the first receiver 21c. That is, the first cleaning liquid 11 that passes through the first washing-capturing space 21a is directly received by the first receiver 21c. The first receiver 21c includes a receiver body which receives and stores the first cleaning liquid 11, an opening which is arranged between the receiver bodies and allows the decarbonated combustion exhaust gas 3 to pass therethrough, and a cover which covers the opening from above and suppresses the first cleaning liquid 11 from passing through the opening.

A first circulation line 50 which circulates the first cleaning liquid 11 is connected to the first washer 21. That is, the first circulation pump 51 is arranged in first circulation line 50. A part of the first cleaning liquid 11 stored in the first receiver 21c is extracted from the first receiver 21c by the first circulation pump 51, and is supplied to the first spray 21b through the first circulation line 50. In this way, the first cleaning liquid 11 circulates. The pressure of the first cleaning liquid 11 supplied to the first spray 21b is increased by the first circulation pump 51.

The first washing-capturing space 21a according to this embodiment can be defined by a distance from the first spray 21b to the first receiver 21c. In this case, by setting the distance from the first spray 21b to the first receiver 21c to at least 1 m or more, preferably 1.5 m or more, a sufficient first washing-capturing space 21a can be arranged. Further, the distance from the first spray 21b to the first receiver 21c may be 5 m or less.

The lean liquid line 16 according to this embodiment is connected to the first circulation line 50. The lean liquid line 16 may be connected to an upstream position of the first circulation line 50 with respect to the first circulation pump 51. More specifically, the downstream end of the lean liquid line 16 may be connected to the upstream position of the first circulation line 50 with respect to the first circulation pump 51. The lean liquid 5 supplied from the lean liquid line 16 is mixed into the first cleaning liquid 11 flowing through the first circulation line 50. The first cleaning liquid 11 mixed with the lean liquid 5 passes through the first circulation pump 51 and is supplied to the first spray 21b.

In this embodiment, the liquid diffuser 20b is arranged above the carbon dioxide capturer 20a. The liquid diffuser 20b is configured to diffuse and drop the first cleaning liquid 11 supplied from a bypass line 60 described later as the lean liquid 5 toward the carbon dioxide capturer 20a. From this liquid diffuser 20b, the lean liquid 5 is supplied to the surface of the internal structure of the carbon dioxide capture packed bed 20d. The pressure of the lean liquid 5 supplied to the liquid diffuser 20b is a pressure that is not so high as compared with the inner pressure of the absorption column 20, and the liquid diffuser 20b drops the lean liquid 5 to the carbon dioxide capture packed bed 20d substantially by the action of gravity rather than force.

The first receiver 21c and the liquid diffuser 20b are connected by the bypass line 60. The bypass line 60 supplies a part of the first cleaning liquid 11 in the first receiver 21c to the liquid diffuser 20b. The bypass line 60 may be arranged with a pump (not illustrated), but may not be arranged. Even in the latter case, the first cleaning liquid 11 stored in the first receiver 21c can be supplied to the liquid diffuser 20b by the action of gravity.

As described above, according to this embodiment, the lean liquid line 16 is connected to the first circulation line 50 that supplies the first cleaning liquid 11 in the first receiver 21c to the first spray 21b. As a result, the lean liquid 5 can be mixed into the first cleaning liquid 11 and supplied to the first spray 21b. For this reason, the mist-like amine accompanying the decarbonated combustion exhaust gas 3 can be trapped by the mist of the first cleaning liquid 11 sprayed from the first spray 21b.

According to this embodiment, the mist of the first cleaning liquid 11 sprayed from the first spray 21b is received by the first receiver 21c. As a result, the lean liquid 5 that traps the mist-like amine can be stored in the first receiver 21c. When a flow rate adjustment valve (not illustrated) is arranged in at least one of the first circulation line 50 and the bypass line 60, the supply amount of the first cleaning liquid 11 supplied to the first spray 21b and the supply amount of the lean liquid 5 supplied from the liquid diffuser 20b can be adjusted. For this reason, it is possible to perform an appropriate operation according to the situation. For example, the spray amount of the first cleaning liquid 11 from the first spray 21b may be larger than the supply amount of the lean liquid 5 supplied from the liquid diffuser 20b. In this case, the spray amount of the first cleaning liquid 11 from the first spray 21b can be increased, and the ability to trap the mist-like amine can be enhanced.

According to this embodiment, the lean liquid line 16 is connected to the upstream position of the first circulation line 50 with respect to the first circulation pump 51. As a result, it is possible to prevent the lean liquid 5 from flowing back in the lean liquid line 16. That is, when the spray amount of the first cleaning liquid 11 from the first spray 21b is increased, the discharge amount of the first circulation pump 51 is increased. When the lean liquid line 16 is connected to a downstream position of the first circulation line 50 with respect to the first circulation pump 51, the lean liquid 5 may flow back in the lean liquid line 16 depending on the discharge amount of the first circulation pump 51. However, according to this embodiment, the lean liquid line 16 is connected to the upstream position with respect to the first circulation pump 51. As a result, it is possible to suppress the lean liquid 5 from flowing back in the lean liquid line 16.

According to this embodiment, the bypass line 60 supplies the first cleaning liquid 11 in the first receiver 21c to the carbon dioxide capturer 20a. As a result, the first cleaning liquid 11 that traps the mist-like amine can be supplied to the liquid diffuser 20b by the bypass line 60, and can be used as an absorbing liquid. For this reason, the amine captured from the decarbonated combustion exhaust gas 3 can be easily used.

Third Embodiment

Next, a carbon dioxide capture system and a method of operating the carbon dioxide capture system according to a third embodiment of the present invention will be described with reference to FIG. 4.

Figure 4:
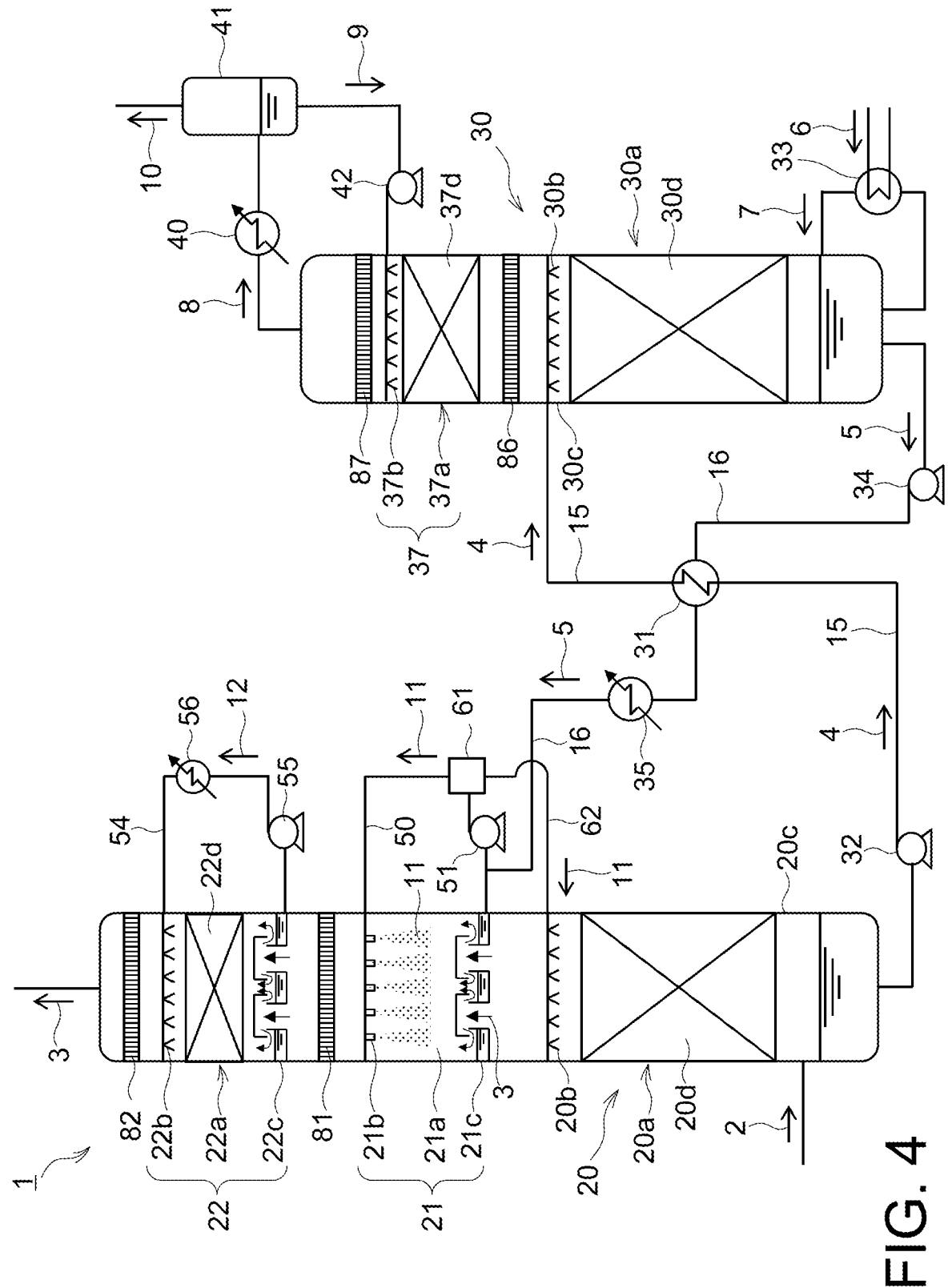
FIG. 4 is a diagram illustrating an overall configuration of a carbon dioxide capture system according to a third embodiment of the present invention.

The third embodiment illustrated in FIG. 4 is mainly different in that the first circulation line is arranged with a cleaning liquid distributor capable of adjusting the amount of the first cleaning liquid supplied to the first spray and the amount of the first cleaning liquid supplied to the carbon dioxide capturer, and other configurations are substantially the same as those of the second embodiment illustrated in FIG. 3. Incidentally, in FIG. 4, the same parts as those in the second embodiment illustrated in FIG. 3 are denoted by the same reference numerals, and detailed description will be omitted.

In this embodiment, as illustrated in FIG. 4, a cleaning liquid distributor 61 is arranged in the first circulation line 50. The cleaning liquid distributor 61 is arranged on the downstream side with respect to the connection position between the first circulation line 50 and the lean liquid line 16. A cleaning liquid distribution line 62 for supplying the first cleaning liquid 11 to the carbon dioxide capturer 20a is connected to the cleaning liquid distributor 61. The upstream end of the cleaning liquid distribution line 62 is connected to the cleaning liquid distributor 61, and the downstream end of the cleaning liquid distribution line 62 is connected to the liquid diffuser 20*b*. In this embodiment, the bypass line 60 illustrated in FIG. 3 is not provided.

The cleaning liquid distributor 61 can distribute the first cleaning liquid 11 to the first spray 21*b* and the carbon dioxide capturer 20*a*. More specifically, the cleaning liquid distributor 61 can adjust the amount of the first cleaning liquid 11 supplied to the first spray 21*b* and the amount of the first cleaning liquid 11 supplied to the carbon dioxide capturer 20*a*. That is, the cleaning liquid distributor 61 can adjust the supply amount of the first cleaning liquid 11 supplied to the first spray 21*b* and the supply amount of the first cleaning liquid 11 supplied to the liquid diffuser 20*b*. For example, the amount of the first cleaning liquid 11 supplied to the first spray 21*b* may be larger than the amount of the first cleaning liquid 11 supplied to the liquid diffuser 20*b*.

For example, the amount of the first cleaning liquid 11 to be distributed may be adjusted on the basis of the amount of water (more specifically, the content of water) in the absorbing liquids 4 and 5. Examples of the water flowing into the absorbing liquids 4 and 5 include water contained in the combustion exhaust gas 2. On the other hand, examples of the water flowing out of the absorbing liquids 4 and 5 include the water or amine contained in the decarbonated combustion exhaust gas 3. Further, in order to adjust the amount of water in the absorbing liquids 4 and 5, the water discharged from the absorbing liquids 4 and 5 to the outside of the carbon dioxide capture system 1 is also exemplified. For this reason, the flow rate of the lean liquid 5 supplied to the carbon dioxide capturer 20*a* and the flow rate of the lean liquid 5 discharged from the regeneration column 30 may not match each other. The cleaning liquid distributor 61 may adjust the flow rate of the first cleaning liquid 11 distributed by the cleaning liquid distributor 61 for the purpose of keeping the amount of water in the absorbing liquids 4 and 5 constant. In this case, the storage amount of the lean liquid 5 stored in a buffer tank (not illustrated) may be measured, and the amount to be distributed by the cleaning liquid distributor 61 may be adjusted on the basis of the storage amount. For example, when the storage amount is large, the amount of the first cleaning liquid 11 supplied to the first spray 21*b* is increased, and when the storage amount is small, the amount of the first cleaning liquid 11 supplied to the carbon dioxide capturer 20*a* is increased. Instead of the storage amount of the lean liquid 5, the amount of water contained in the lean liquid 5 may be measured to adjust the amount to be distributed by the cleaning liquid distributor 61. For example, a measuring instrument using the principle of the Karl Fischer titration method or gas chromatography may be used for measuring the water amount. In this case, in the measured value, by adjusting the amount of water in the absorbing liquids 4 and 5, it is possible to suppress a decrease in the ability to capture the carbon dioxide and to suppress an increase in the viscosity of the absorbing liquids 4 and 5. For example, the buffer tank may be arranged between the heat exchanger 31 and the lean liquid cooler 35 in the lean liquid line 16.

As described above, according to this embodiment, the first circulation line 50 is arranged with the cleaning liquid distributor 61 capable of adjusting the amount of the first cleaning liquid 11 supplied to the first spray 21*b* and the amount of the first cleaning liquid 11 supplied to the carbon dioxide capturer 20*a*. As a result, the amount of the first cleaning liquid 11 supplied to the first spray 21*b* and the amount of the first cleaning liquid 11 supplied to the carbon dioxide capturer 20*a* can be adjusted. For this reason, it is possible to adjust the amount of water in the absorbing liquid 4 or 5 and to stabilize the operation of the carbon dioxide capture system 1.

Fourth Embodiment

Next, a carbon dioxide capture system and a method of operating the carbon dioxide capture system according to a fourth embodiment of the present invention will be described with reference to FIG. 5.

Figure 5:
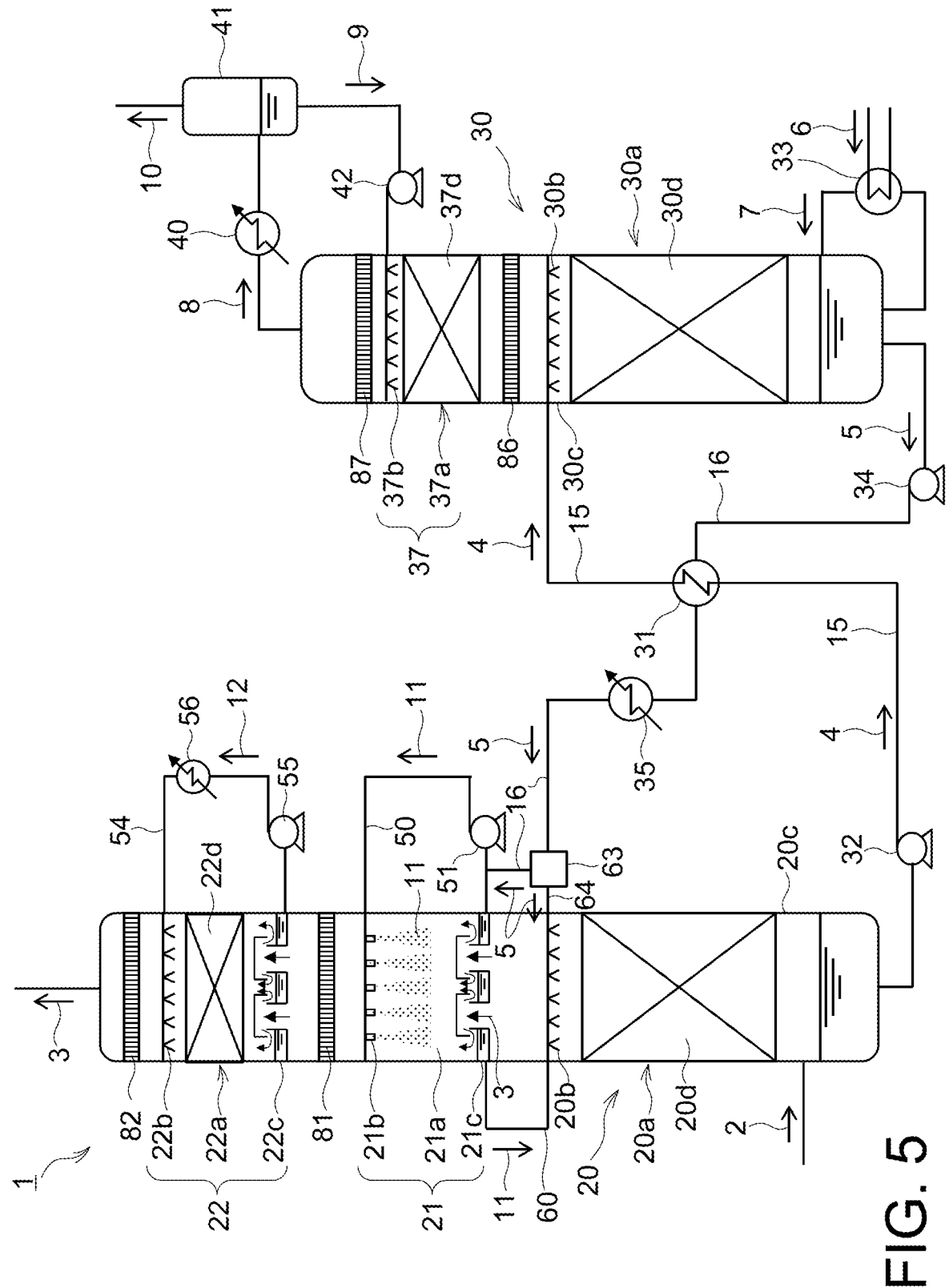
FIG. 5 is a diagram illustrating an overall configuration of a carbon dioxide capture system according to a fourth embodiment of the present invention.

The fourth embodiment illustrated in FIG. 5 is mainly different in that the absorbing liquid line is arranged with an absorbing liquid distributor capable of adjusting the amount of the absorbing liquid supplied to the first circulation line and the amount of the absorbing liquid supplied to the carbon dioxide capturer, and other configurations are substantially the same as those of the second embodiment illustrated in FIG. 3. Incidentally, in FIG. 5, the same parts as those in the second embodiment illustrated in FIG. 3 are denoted by the same reference numerals, and detailed description will be omitted.

In this embodiment, as illustrated in FIG. 5, an absorbing liquid distributor 63 is arranged in the lean liquid line 16. The absorbing liquid distributor 63 is arranged on the downstream side of the lean liquid line 16 with respect to the lean liquid cooler 35. An absorbing liquid distribution line 64 for supplying the lean liquid 5 to the carbon dioxide capturer 20*a* is connected to the absorbing liquid distributor 63. The upstream end of the absorbing liquid distribution line 64 is connected to the absorbing liquid distributor 63, and the downstream end of the absorbing liquid distribution line 64 is connected to the liquid diffuser 20*b*.

The absorbing liquid distributor 63 can distribute the lean liquid 5 to the first circulation line 50 and the carbon dioxide capturer 20*a*. More specifically, the absorbing liquid distributor 63 can adjust the amount of the lean liquid 5 supplied to the first circulation line 50 and the amount of the lean liquid 5 supplied to the carbon dioxide capturer 20*a*. That is, the absorbing liquid distributor 63 can adjust the supply amount of the lean liquid 5 supplied to the first circulation line 50 and the supply amount of the lean liquid 5 supplied to the liquid diffuser 20*b*. For example, the amount of the lean liquid 5 to be distributed may be adjusted so that the storage amount of the first cleaning liquid 11 stored in the first receiver 21*c* becomes constant. In this case, the liquid level of the first cleaning liquid 11 stored in the first receiver 21*c* may be measured, and the amount of the lean liquid 5 to be distributed may be adjusted so that the liquid level is constant. For example, when the storage amount is large, the amount of the lean liquid 5 supplied to the carbon dioxide capturer 20*a* is increased, and when the storage amount is small, the amount of the lean liquid 5 supplied to the first circulation line 50 is increased. In this way, it is possible to secure the amount of the first cleaning liquid 11 sprayed from the first spray 21*b* and to secure the ability to trap the mist-like amine.

As described above, according to this embodiment, the lean liquid line 16 is arranged with the absorbing liquid distributor 63 capable of adjusting the amount of the lean liquid 5 supplied to the first circulation line 50 and the amount of the lean liquid 5 supplied to the carbon dioxide capturer 20*a*. As a result, the amount of the lean liquid 5 supplied to the first circulation line 50 and the amount of the lean liquid 5 supplied to the carbon dioxide capturer 20*a* can be adjusted. For this reason, for example, the storage amount of the first cleaning liquid 11 stored in the first receiver 21*c* can be made constant, the amount of the first cleaning liquid 11 sprayed from the first spray 21b can be secured, and the ability to trap the mist-like amine can be secured.

According to this embodiment, the absorbing liquid distributor 63 is arranged on the downstream side with respect to the lean liquid cooler 35. As a result, even when the temperature of the lean liquid 5 discharged from the heat exchanger 31 is high, the temperature of the lean liquid 5 supplied to the carbon dioxide capturer 20a can be lowered to a temperature at which the capture efficiency of carbon dioxide is excellent. For this reason, in the carbon dioxide capturer 20a, the capture efficiency of carbon dioxide from the combustion exhaust gas 2 can be improved.

Fifth Embodiment

Next, a carbon dioxide capture system and a method of operating the carbon dioxide capture system according to a fifth embodiment of the present invention will be described with reference to FIG. 6.

Figure 6:
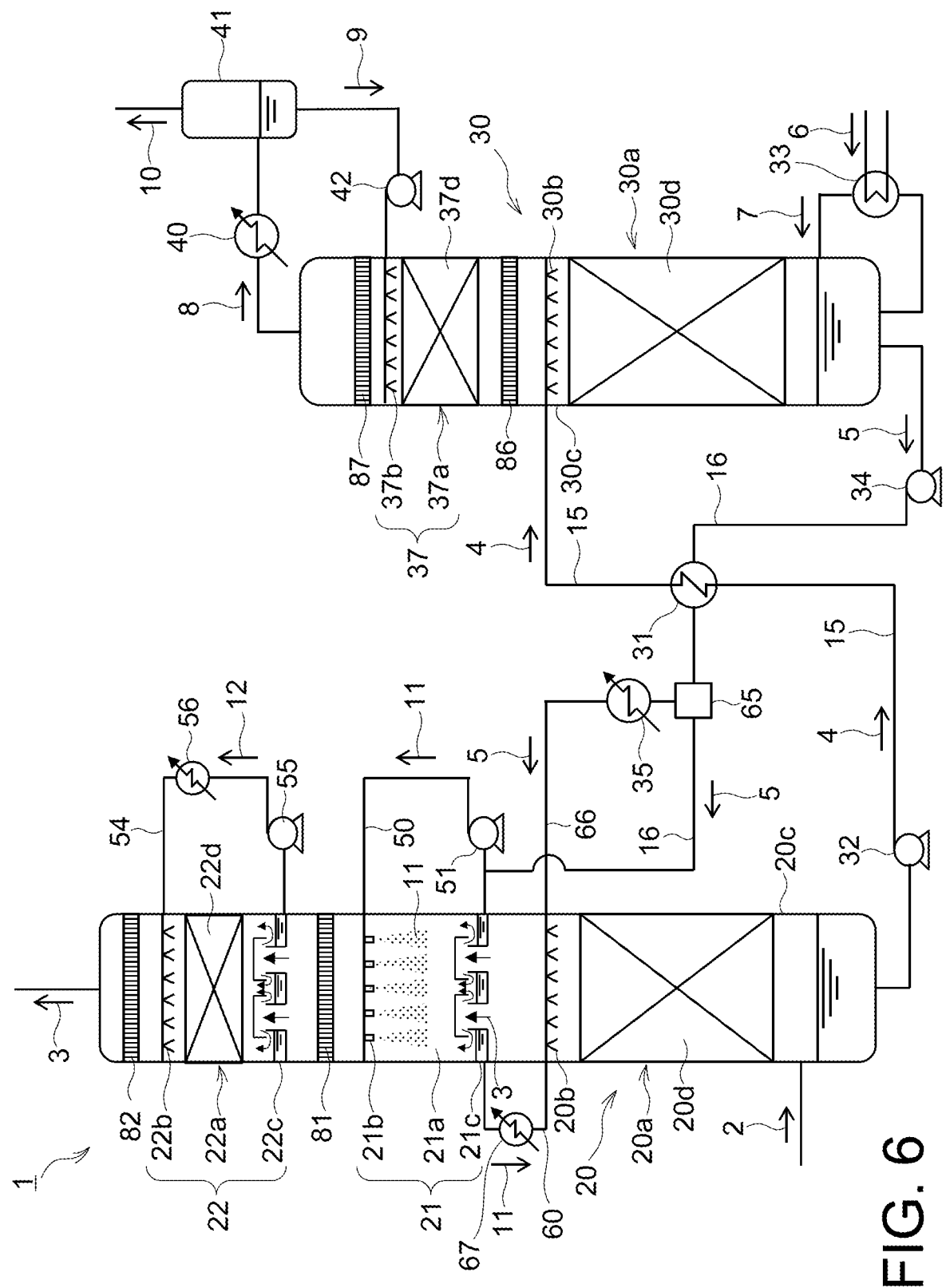
FIG. 6 is a diagram illustrating an overall configuration of a carbon dioxide capture system according to a fifth embodiment of the present invention.

The fifth embodiment illustrated in FIG. 6 is mainly different in that an absorbing liquid cooler is arranged in the absorbing liquid distribution line, and other configurations are substantially the same as those of the fourth embodiment illustrated in FIG. 5. Incidentally, in FIG. 6, the same parts as those in the fourth embodiment illustrated in FIG. 5 are denoted by the same reference numerals, and detailed description will be omitted.

In this embodiment, as illustrated in FIG. 6, an absorbing liquid distributor 65 is arranged in the lean liquid line 16. An absorbing liquid distribution line 66 for supplying the lean liquid 5 to the carbon dioxide capturer 20a is connected to the absorbing liquid distributor 65. The upstream end of the absorbing liquid distribution line 66 is connected to the absorbing liquid distributor 65, and the downstream end of the absorbing liquid distribution line 66 is connected to the liquid diffuser 20b.

The absorbing liquid distributor 65 can adjust the amount of the lean liquid 5 supplied to the first circulation line 50 and the amount of the lean liquid 5 supplied to the carbon dioxide capturer 20a. That is, the absorbing liquid distributor 65 can adjust the supply amount of the lean liquid 5 supplied to the first circulation line 50 and the supply amount of the lean liquid 5 supplied to the liquid diffuser 20b.

The lean liquid cooler 35 according to this embodiment is arranged in the absorbing liquid distribution line 66. The absorbing liquid distributor 65 is arranged on the upstream side with respect to the lean liquid cooler 35. More specifically, the absorbing liquid distributor 65 is arranged between the heat exchanger 31 and the lean liquid cooler 35.

Here, the mist-like amine accompanying the decarbonated combustion exhaust gas 3 is hardly captured by washing using a cleaning liquid, a packed bed, and the like. For this reason, in this embodiment, the mist of the first cleaning liquid 11 sprayed from the first spray 21b of the first washer 21 is brought into collision with the mist-like amine, and the mist-like amine is captured into the mist of the first cleaning liquid 11. However, when the particle size of the mist-like amine decreases (for example, when the thickness is 0.5 μm or less), the capture efficiency of the mist-like amine decreases. For this reason, in order to increase the capture efficiency of the mist-like amine, it is effective to increase the particle size of the mist-like amine.

As a method for increasing the particle size of the mist-like amine, it is conceivable to make the temperature of the second washer 22 lower than the temperature of the first washer 21 to increase the temperature difference therebetween. In this case, the decarbonated combustion exhaust gas 3 is cooled when passing through the second washer 22, the water vapor contained in the decarbonated combustion exhaust gas 3 is condensed, and the condensed water is trapped by the mist-like amine, so that the particle size of the mist-like amine can be increased.

There are two possible methods for making the temperature of the second washer 22 lower than the temperature of the first washer 21. The first method is a method of heating the first washer 21, and the second method is a method of cooling the second washer 22.

The cleaning liquid may be cooled for the purpose of reducing the amine vapor pressure in the cleaning liquid. However, while the operation temperature of a general cleaning liquid is about 30° C. to 40° C., the temperature of the cooled cleaning liquid remains about 20° C. to 30° C., and the temperature difference obtained by cooling becomes small. Thus, it is difficult to increase the temperature difference between the first washer 21 and the second washer 22 by cooling the second cleaning liquid 12. Further, when the second cleaning liquid 12 is cooled using a chiller or the like having a high cooling ability in order to increase the temperature difference, the energy required for cooling increases rapidly although the temperature of the cleaning liquid can be further lowered. One of the major problems of the carbon dioxide capture system 1 is how to reduce the energy required for capturing carbon dioxide. For this reason, it is not preferable to increase the energy for cooling the decarbonated combustion exhaust gas 3.

In this regard, in this embodiment, attention is paid to the fact that the lean liquid 5 discharged from the heat exchanger 31 is cooled by the lean liquid cooler 35. That is, the temperature of the first washer 21 during operation is about 30° C. to 40° C., and the temperature of the lean liquid 5 discharged from the heat exchanger 31 is about 50° C. to 60° C. The lean liquid 5 before being cooled by the lean liquid cooler 35 is supplied to the first washer 21. As a result, the temperature of the first cleaning liquid 11 is increased, and the temperature difference between the first washer 21 and the second washer 22 can be increased. For this reason, the amount of condensed water in the second washer 22 can be increased. The temperature of the first washer 21 is preferably higher by 5° C. to 50° C., and more preferably higher by 10° C. to 30° C. than the temperature at the upper end of the carbon dioxide capturer 20a.

As illustrated in FIG. 6, the bypass line 60 is arranged with a bypass cooler 67 that cools the first cleaning liquid 11. As described above, since the temperature of the first cleaning liquid 11 is increased, it is preferable to cool the first cleaning liquid 11 supplied from the first receiver 21c to the liquid diffuser 20b. For this reason, the bypass cooler 67 is arranged in the bypass line 60. The first cleaning liquid 11 stored in the first receiver 21c is cooled by the bypass cooler 67 and then supplied to the liquid diffuser 20b. The bypass cooler 67 may cool the first cleaning liquid 11 to the same degree as the temperature of the lean liquid 5 cooled in the lean liquid cooler 35 illustrated in FIG. 1 and the like.

As described above, according to this embodiment, the lean liquid line 16 is arranged with the absorbing liquid distributor 65 capable of adjusting the amount of the lean liquid 5 supplied to the first circulation line 50 and the amount of the lean liquid 5 supplied to the carbon dioxide capturer 20a. As a result, the temperature of the lean liquid 5 supplied to the first circulation line 50 can be increased, and the temperature of the first cleaning liquid 11 can be made higher than the temperature of the second cleaning liquid 12. For this reason, the difference between the temperature of the first cleaning liquid 11 and the temperature of the second cleaning liquid 12 can be increased, and the particle size of the mist-like amine can be increased. As a result, the capture efficiency of the mist-like amine can be improved. The amount of amine discharged into the atmosphere can be further reduced.

According to this embodiment, the bypass line 60 is arranged with the bypass cooler 67 that cools the first cleaning liquid 11. As a result, the first cleaning liquid 11 supplied to the liquid diffuser 20b can be cooled, and the temperature of the first cleaning liquid 11 can be lowered. For this reason, in the carbon dioxide capturer 20a, the capture efficiency of carbon dioxide from the combustion exhaust gas 2 can be improved.

Sixth Embodiment

Next, a carbon dioxide capture system and a method of operating the carbon dioxide capture system according to a sixth embodiment of the present invention will be described with reference to FIG. 7.

Figure 7:
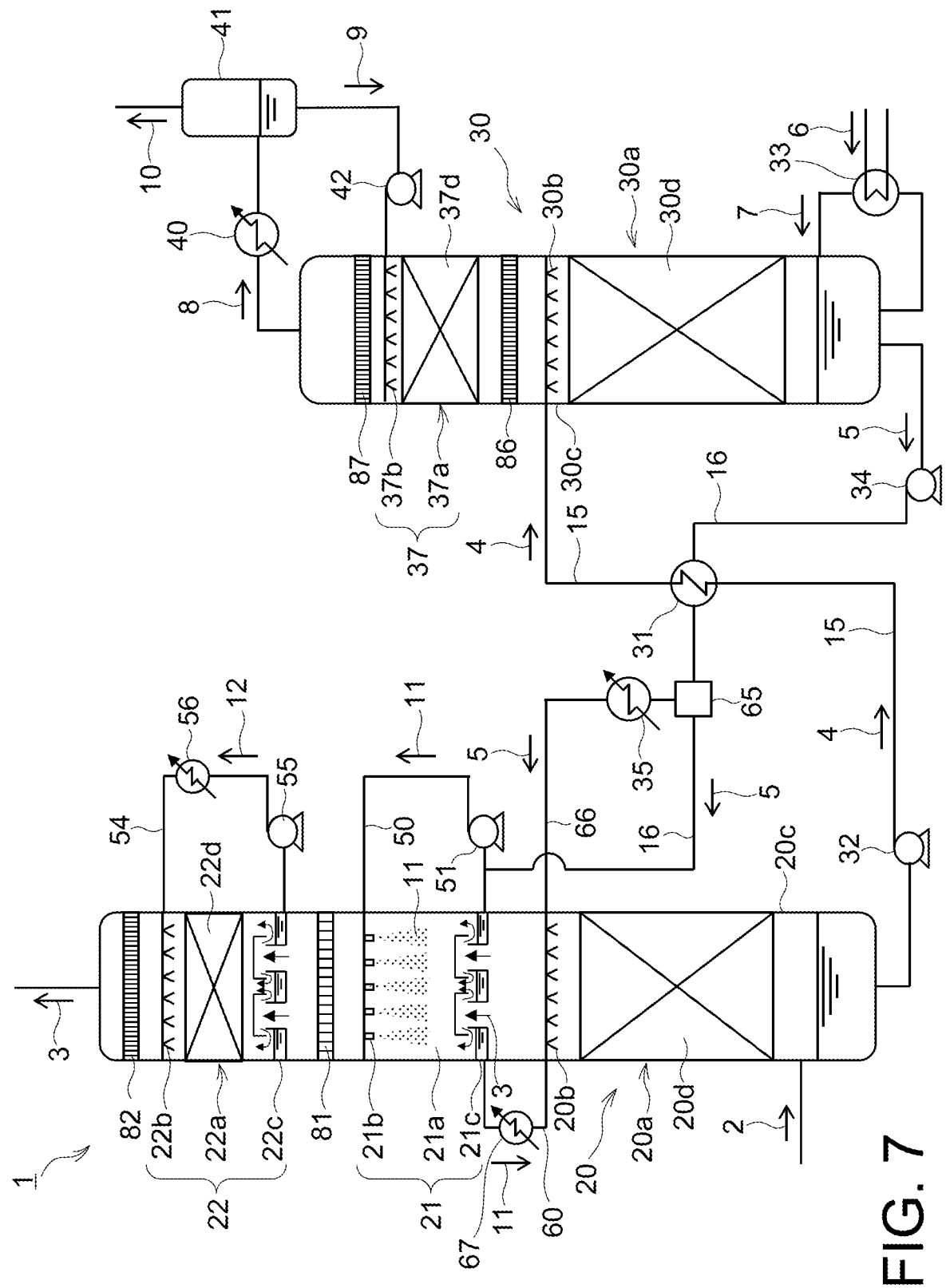
FIG. 7 is a diagram illustrating an overall configuration of a carbon dioxide capture system according to a sixth embodiment of the present invention.

The sixth embodiment illustrated in FIG. 7 is mainly different in that the first washer exit demister is formed sparser than the second washer exit demister, and other configurations are substantially the same as those of the fifth embodiment illustrated in FIG. 6. Incidentally, in FIG. 7, the same parts as those in the fifth embodiment illustrated in FIG. 6 are denoted by the same reference numerals, and detailed description will be omitted.

In this embodiment, as illustrated in FIG. 7, the first washer exit demister 81 is formed sparser than the second washer exit demister.

The fact that the demister is formed sparsely or densely can be explained, for example, on the basis of the porosity of the demister. More specifically, the magnitude of the porosity of the demister may correspond to the sparseness or denseness of the demister. In this case, the fact that the first washer exit demister 81 is formed more sparsely than the second washer exit demister 82 means that the porosity of the first washer exit demister 81 is larger than the porosity of the second washer exit demister 82. As a result, the space of the first washer exit demister 81 through which the decarbonated combustion exhaust gas 3 passes increases, and the decarbonated combustion exhaust gas 3 easily passes therethrough. For this reason, the pressure loss generated in the flow of the decarbonated combustion exhaust gas 3 can be reduced. For example, in a case where the first washer exit demister 81 and the second washer exit demister 82 are mesh-like demisters, the mesh of the first washer exit demister 81 may be coarser than the mesh of the second washer exit demister 82.

The fact that the demister is formed sparsely or densely can also be explained, for example, on the basis of the mist removal (or capture) rate characteristics of the demister. More specifically, when the characteristics of the demister are indicated by the mist removal rate in a predetermined particle size range (for example, 0.1 μm to 10 μm), the magnitude of the removal rate may be made to correspond to the sparseness or denseness of the dense demister. In this case, the fact that the first washer exit demister 81 is formed more sparsely than the second washer exit demister 82 means that the removal rate of the mist in the predetermined particle size range in the first washer exit demister 81 is smaller than the removal rate of the second washer exit demister 82.

The mist of the first cleaning liquid 11 sprayed from the first spray 21b is larger than the particle size of the mist-like amine accompanying the decarbonated combustion exhaust gas 3, and has, for example, a diameter of 100 μm or more. The first washer exit demister 81 according to this embodiment is formed sparser than the second washer exit demister 82. As a result, the first washer exit demister 81 can be configured by a demister coarser than the second washer exit demister 82. For this reason, it is possible to suppress an increase in pressure loss, and it is possible to suppress an increase in the power of the blower that supplies the combustion exhaust gas 2 to the absorption column 20. Further, even when the mist of the first cleaning liquid 11 having a large particle size accompanies the decarbonated combustion exhaust gas 3, occurrence of clogging in the first washer exit demister 81 can be suppressed. Further, even when a large amount of mist of the first cleaning liquid 11 accompanies the decarbonated combustion exhaust gas 3, the occurrence of clogging in the first washer exit demister 81 can be suppressed.

On the other hand, the second washer exit demister 82 can be configured by a fine-grained demister and can effectively trap the mist-like amine that cannot be trapped by the first washer exit demister 81. That is, the second washer exit demister 82 can remove not only the mist of the second cleaning liquid 12 but also the mist of the first cleaning liquid 11 having a relatively small particle size. Further, the second washer exit demister 82 can trap the mist-like amine having a relatively small particle size that passes through the first washer exit demister 81. When passing through the second washer 22, the particle size is enlarged by condensation of water, and the mist-like amine is also trapped by the second washer exit demister 82.

As described above, according to this embodiment, the first washer exit demister 81 is formed sparser than the second washer exit demister 82. As a result, it is possible to suppress an increase in pressure loss in the first washer exit demister 81 and to suppress the occurrence of clogging while effectively trapping the mist-like amine and the mist of the first cleaning liquid 11 accompanying the decarbonated combustion exhaust gas 3. In this case, the power of the blower for supplying the combustion exhaust gas 2 to the absorption column 20 can be reduced, and the operating cost can be reduced.

Seventh Embodiment

Next, a carbon dioxide capture system and a method of operating the carbon dioxide capture system according to a seventh embodiment of the present invention will be described with reference to FIG. 8.

Figure 8:
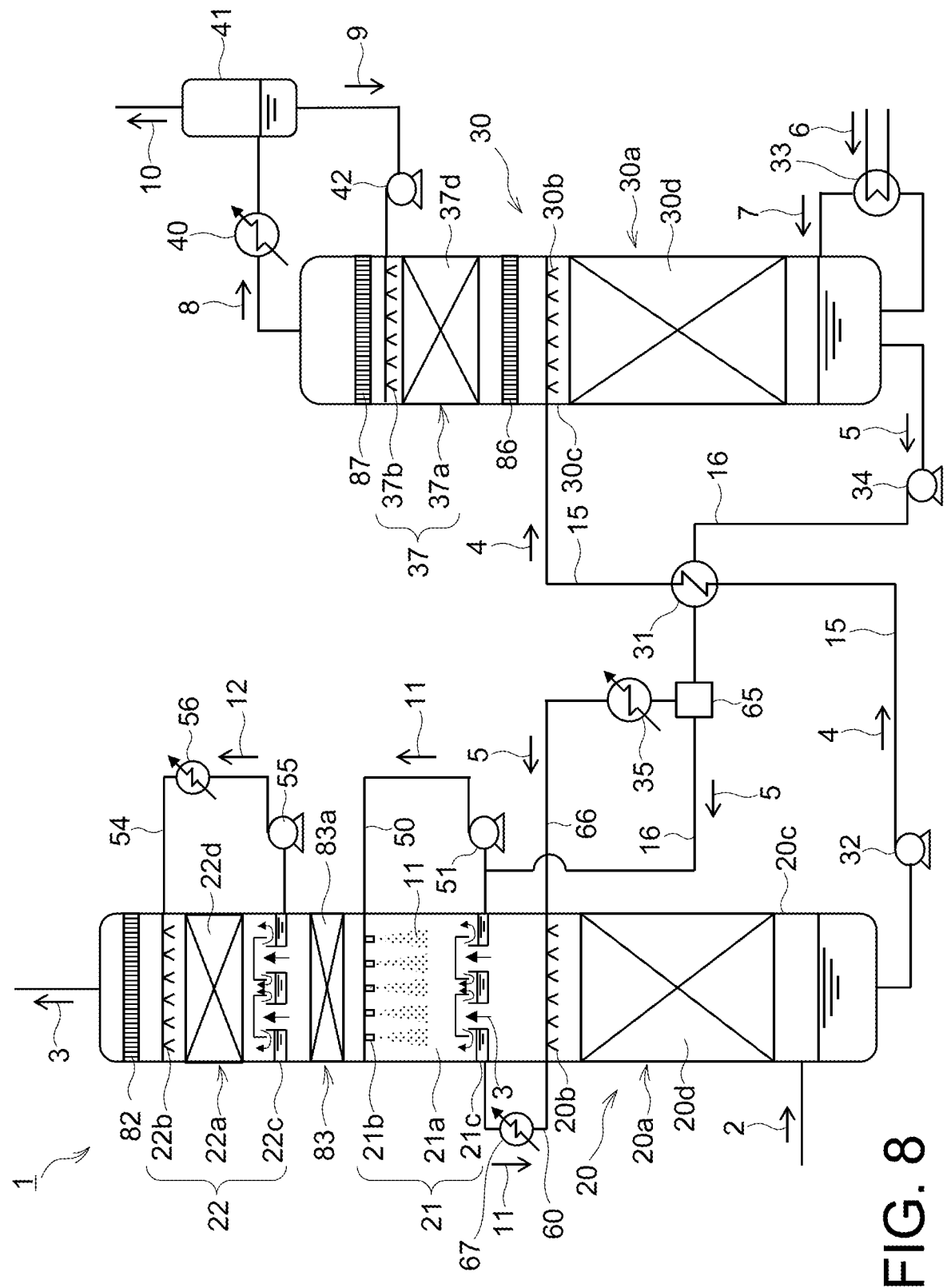
FIG. 8 is a diagram illustrating an overall configuration of a carbon dioxide capture system according to a seventh embodiment of the present invention.

The seventh embodiment illustrated in FIG. 8 is mainly different in that a cleaning liquid mist capturer arranged between the first washer and the second washer has a mist capture packed bed for capturing the mist of the first cleaning liquid, and other configurations are substantially the same as those of the fifth embodiment illustrated in FIG. 6. Incidentally, in FIG. 8, the same parts as those in the fifth embodiment illustrated in FIG. 6 are denoted by the same reference numerals, and detailed description will be omitted.

In this embodiment, as illustrated in FIG. 8, the cleaning liquid mist capturer 83 is arranged between the first washer 21 and the second washer 22. The cleaning liquid mist capturer 83 is arranged above the first spray 21b and below the second receiver 22c. The cleaning liquid mist capturer 83 captures the mist of the first cleaning liquid 11 accompanying the decarbonated combustion exhaust gas 3 discharged from the first washer 21.

The cleaning liquid mist capturer 83 may be configured as a countercurrent gas-liquid contact device. As an example, the cleaning liquid mist capturer 83 includes a mist capture packed bed 83a. The mist capture packed bed 83a is configured by an internal structure such as packing or particles filled inside to increase the gas-liquid contact area. A mist of the first cleaning liquid 11 accompanying the decarbonated combustion exhaust gas 3 discharged from the first washer 21 is brought into contact with and adhered to the surface of the internal structure. Accordingly, the mist of the first cleaning liquid 11 is captured (or removed) from the decarbonated combustion exhaust gas 3.

In this embodiment, the mist capture packed bed 83a of the cleaning liquid mist capturer 83 may be configured so that the pressure loss generated in the flow of the decarbonated combustion exhaust gas 3 passing through the mist capture packed bed 83a can be lower than the pressure loss generated in the flow in the second washer exit demister 82. For example, the porosity of the mist capture packed bed 83a may be larger than the porosity of the second washer exit demister 82. In other words, the specific surface area of the mist capture packed bed 83a may be smaller than the specific surface area of the second washer exit demister 82. That is, as described later, the mist capture packed bed 83a aims to trap the mist of the first cleaning liquid 11 having a relatively large particle size. On the other hand, the second washer exit demister 82 aims to trap the mist-like amine accompanying the decarbonated combustion exhaust gas 3, but the mist-like amine has a relatively small particle size. Consequently, in order to reduce the pressure loss, the porosity of the mist capture packed bed 83a may be larger than the porosity of the second washer exit demister 82, and the mist of the first cleaning liquid 11 can be effectively trapped.

As described above, according to this embodiment, the cleaning liquid mist capturer 83 arranged between first washer 211 and second washer 22 includes mist capture packed bed 83a that captures the mist of first cleaning liquid 11. As a result, it is possible to suppress an increase in pressure loss in the cleaning liquid mist capturer 83 and to suppress the occurrence of clogging while effectively trapping the mist-like amine and the mist of the first cleaning liquid 11 accompanying the decarbonated combustion exhaust gas 3. In this case, the power of the blower for supplying the combustion exhaust gas 2 to the absorption column 20 can be reduced, and the operating cost can be reduced.

Eighth Embodiment

Next, a carbon dioxide capture system and a method of operating the carbon dioxide capture system according to an eighth embodiment of the present invention will be described with reference to FIG. 9.

Figure 9:
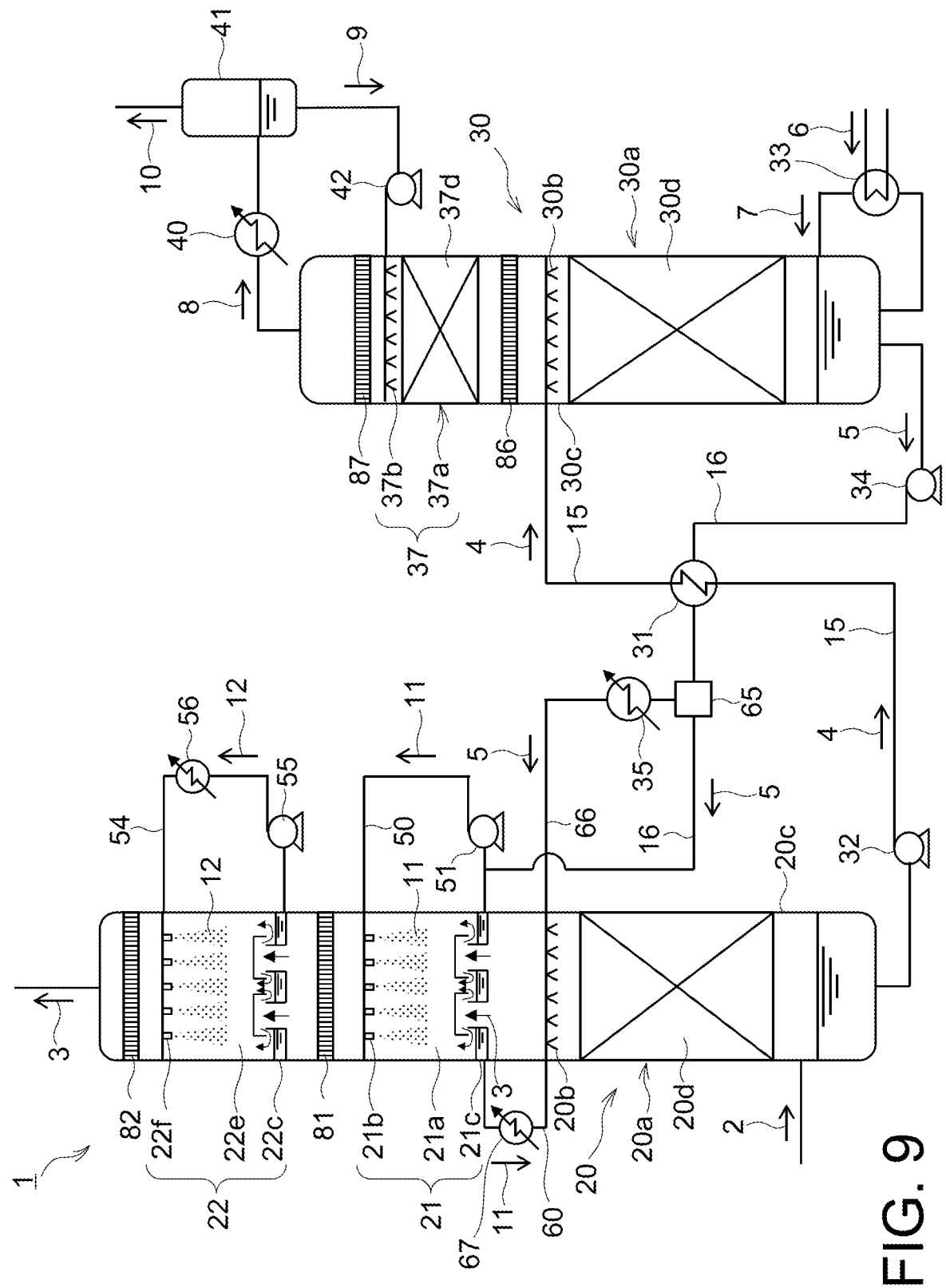
FIG. 9 is a diagram illustrating an overall configuration of a carbon dioxide capture system according to an eighth embodiment of the present invention.

The eighth embodiment illustrated in FIG. 9 is mainly different in that the second washer sprays the second cleaning liquid with the second spray to capture the amine accompanying the combustion exhaust gas with the mist of the second cleaning liquid, and other configurations are substantially the same as those of the fifth embodiment illustrated in FIG. 6. Incidentally, in FIG. 9, the same parts as those in the fifth embodiment illustrated in FIG. 6 are denoted by the same reference numerals, and detailed description will be omitted.

In this embodiment, as illustrated in FIG. 9, the second washer 22 sprays the second cleaning liquid 12 with a second spray 22f to capture the amine accompanying the decarbonated combustion exhaust gas 3 with the mist of the second cleaning liquid 12. More specifically, the second washer 22 includes a second washing-capturing space 22e, a second spray 22f arranged above the second washing-capturing space 22e, and the second receiver 22c arranged below the second washing-capturing space 22e.

The second washing-capturing space 22e is a space arranged below the second spray 22f. In this embodiment, the second washing-capturing space 22e is a space arranged from the second spray 22f to the second receiver 22c. The second cleaning liquid 12 is sprayed from the second spray 22f into the second washing-capturing space 22e. The sprayed second cleaning liquid 12 comes into contact with the rising decarbonated combustion exhaust gas 3 while freely dropping in a mist state in the second washing-capturing space 22e (that is, dropping without contacting the surface of a structure or the like in the space). Accordingly, the amine accompanying the decarbonated combustion exhaust gas 3 is captured. In the second washer 22, the mist-like amine can be effectively captured, and the gaseous amine can also be effectively captured.

In this embodiment, as described above, the second washing-capturing space 22e is formed between the second spray 22f and the second receiver 22c. The second washing-capturing space 22e is not provided with a structure such as a packed bed or a shelf for bringing the second cleaning liquid 12 into contact with the decarbonated combustion exhaust gas 3 while flowing down on the surface. That is, a structure or the like in which the second cleaning liquid 12 flows down on the surface is not provided between the second spray 22f and the second receiver 22c, and the second washing-capturing space 22e is formed from the second spray 22f to the second receiver 22c. As a result, the second washing-capturing space 22e is configured such that the second cleaning liquid 12 comes into contact with the decarbonated combustion exhaust gas 3 while dropping freely. The mist of the second cleaning liquid 12 sprayed from the second spray 22f drops in the second washing-capturing space 22e where the decarbonated combustion exhaust gas 3 rises, and directly reaches the second receiver 22c. That is, the second cleaning liquid 12 that passes through the second washing-capturing space 22e is directly received by the second receiver 22c. While dropping, the second cleaning liquid 12 comes into contact with the decarbonated combustion exhaust gas 3, and the mist-like amine accompanying the decarbonated combustion exhaust gas 3 physically collides with the mist of the second cleaning liquid 12 and is captured.

The second spray 22f sprays and drops the second cleaning liquid 12 toward the second washing-capturing space 22e. The second spray 22f may be configured similarly to the first spray 21b. The second receiver 22c receives and stores the second cleaning liquid 12 that drops in the second washing-capturing space 22e. The second circulation line 54 which circulates the second cleaning liquid 12 is connected to the second receiver 22c. The second cleaning liquid 12 stored in the second receiver 22c is extracted and supplied to the second spray 22f. In this way, the second cleaning liquid 12 is circulated.

As described above, according to this embodiment, the second cleaning liquid 12 is sprayed by the second spray 22f, and the amine accompanying the decarbonated combustion exhaust gas 3 is captured by the mist of the second cleaning liquid 12. As a result, the mist of the second cleaning liquid 12 can physically collide with the mist-like amine accompanying the decarbonated combustion exhaust gas 3 discharged from the first washer 21. For this reason, the mist-like amine can be effectively captured in the second cleaning liquid 12. Further, since the second cleaning liquid 12 has an amine concentration lower than that of the first cleaning liquid 11, it is also possible to capture the gaseous amine accompanying the decarbonated combustion exhaust gas 3. For this reason, the washing efficiency of the decarbonated combustion exhaust gas 3 can be further improved, and the amount of amine discharged into the atmosphere can be further reduced.

Ninth Embodiment

Next, a carbon dioxide capture system and a method of operating the carbon dioxide capture system according to a ninth embodiment of the present invention will be described with reference to FIG. 10.

Figure 10:
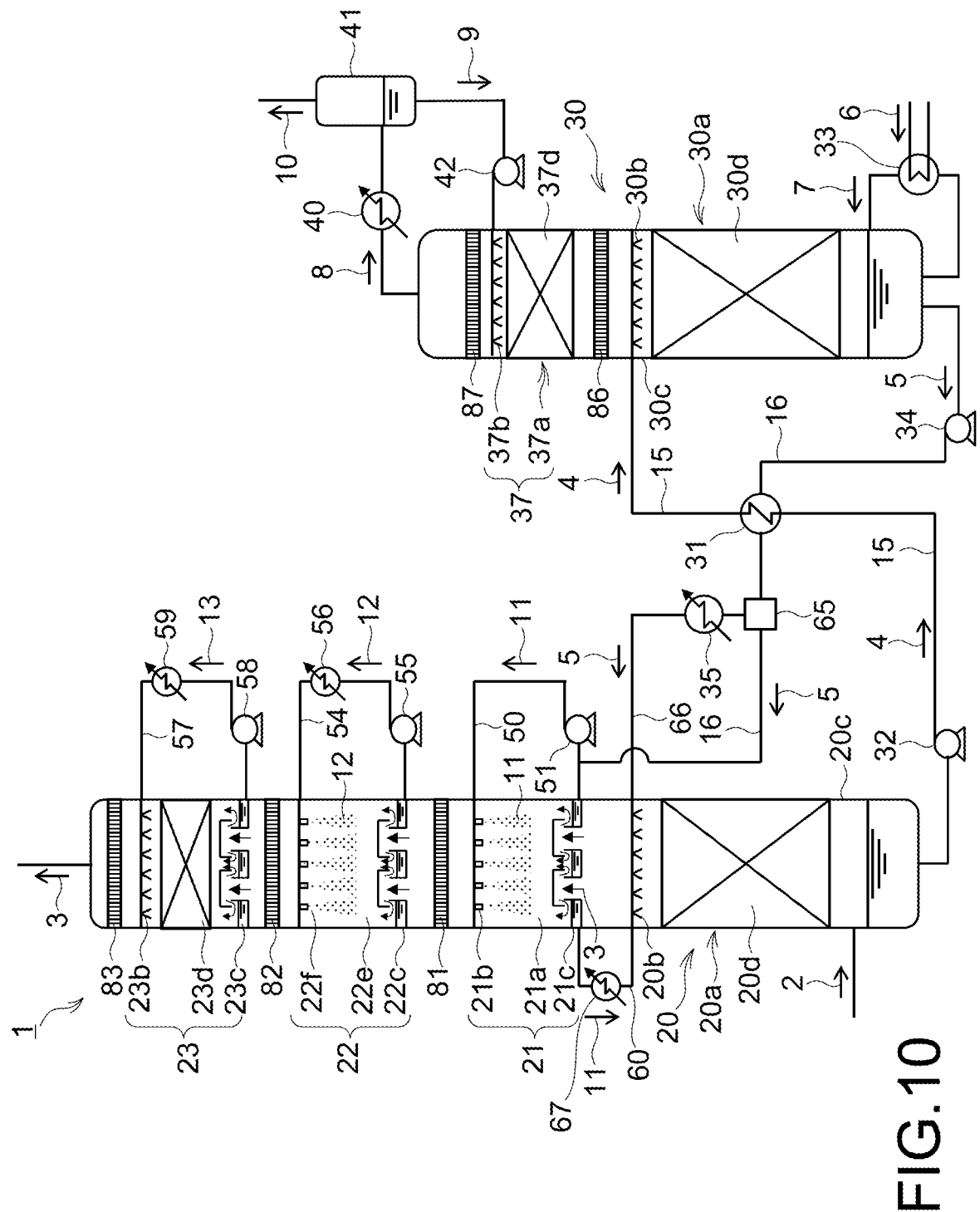
FIG. 10 is a diagram illustrating an overall configuration of a carbon dioxide capture system according to a ninth embodiment of the present invention.

The ninth embodiment illustrated in FIG. 10 is mainly different in that a third washer for washing the combustion exhaust gas discharged from the second washer with a third cleaning liquid and capturing the amine accompanying the combustion exhaust gas is further arranged, and other configurations are substantially the same as those of the eighth embodiment illustrated in FIG. 9. Incidentally, in FIG. 10, the same parts as those in the eighth embodiment illustrated in FIG. 9 are denoted by the same reference numerals, and detailed description will be omitted.

In this embodiment, as illustrated in FIG. 10, a third washer 23 is further housed in the absorption column 20. The third washer 23 washes the decarbonated combustion exhaust gas 3 discharged from the second washer 22 with the third cleaning liquid 13 (or third washing water), and captures the amine as an absorbing liquid component accompanying the decarbonated combustion exhaust gas 3. The third washer 23 is arranged above the second washer 22.

The third washer 23 may be configured similarly to the second washer 22 illustrated in FIG. 1 and the like. That is, the third washer 23 includes a washing capturer 23a, a cleaning liquid diffuser 23b arranged above the washing capturer 23a, and a third receiver 23c arranged below the washing capturer 23a.

The washing capturer 23a is configured as a countercurrent gas-liquid contact device. As an example, the washing capturer 23a includes a washing capture packed bed 23d. In the third washer 23, the gaseous amine can be effectively captured, and the mist-like amine can also be effectively captured.

A third circulation line 57 which circulates the third cleaning liquid 13 is connected to the third washer 23. That is, a third circulation pump 58 is arranged in the third circulation line 57, and extracts the third cleaning liquid 13 stored in the third receiver 23c and supplies the third cleaning liquid 13 to the cleaning liquid diffuser 23b. In this way, the third cleaning liquid 13 is circulated. In this embodiment, a third cleaning liquid cooler 59 which cools the third cleaning liquid 13 is arranged in the third circulation line 57. The third cleaning liquid cooler 59 can be configured similarly to the second cleaning liquid cooler 56.

As described above, according to this embodiment, the decarbonated combustion exhaust gas 3 discharged from the second washer 22 is washed with the third cleaning liquid 13. As a result, the third washer 23 can mainly capture the gaseous amine accompanying the decarbonated combustion exhaust gas 3. More specifically, in the first washer 21, the first cleaning liquid 11 can capture the mist-like amine, and the first cleaning liquid 11 that captures the mist-like amine can be used as the lean liquid 5. In the second washer 22, the second cleaning liquid 12 can capture the mist-like amine that cannot be captured in the first washer 21 and capture the gaseous amine. In the third washer 23, mainly the gaseous amine can be captured. Since the amine concentration of the third cleaning liquid 13 is lower than the amine concentration of the second cleaning liquid 12, the third cleaning liquid 13 can effectively capture the gaseous amine in the third washer 23. As a result, the amount of amine discharged to the atmosphere can be further reduced, and the amount of amine discharged to the outside of the carbon dioxide capture system 1 can be further reduced.

Tenth Embodiment

Next, a carbon dioxide capture system and a method of operating the carbon dioxide capture system according to a tenth embodiment of the present invention will be described with reference to FIG. 11.

The tenth embodiment illustrated in FIG. 11 is mainly different in that a regeneration washer for washing regeneration exhaust gas discharged from the absorbing liquid regenerator with a mist of a regeneration cleaning liquid sprayed by a regeneration spray to capture the amine accompanying the regeneration exhaust gas is further arranged, and other configurations are substantially the same as those of the first embodiment illustrated in FIGS. 1 and 2. Incidentally, in FIG. 11, the same parts as those in the first embodiment illustrated in FIGS. 1 and 2 are denoted by the same reference numerals, and detailed description will be omitted.

In this embodiment, as illustrated in FIG. 11, the regeneration washer 37 sprays the condensed water 9 (regeneration cleaning liquid) by a regeneration spray 37f to capture the amine accompanying the carbon dioxide-containing gas 8 with the mist of the condensed water 9. More specifically, the regeneration washer 37 includes a washing-capturing space 37e and the regeneration spray 37f arranged above the washing-capturing space 37e.

The washing-capturing space 37e is a space arranged below the regeneration spray 37f. In this embodiment, the washing-capturing space 37e is a space arranged from the regeneration spray 37f to the first regeneration column demister 86. The condensed water 9 is sprayed from the regeneration spray 37f into the washing-capturing space 37e. The sprayed condensed water 9 comes into gas-liquid contact with the rising carbon dioxide-containing gas 8 while freely dropping in a mist state in the washing-capturing space 37e (that is, dropping without contacting the surface of a structure or the like in the space). Accordingly, the amine accompanying the carbon dioxide-containing gas 8 is captured. In the regeneration washer 37, the mist-like amine can be effectively captured, and the gaseous amine can also be effectively captured.

In this embodiment, as described above, the washing-capturing space 37e is formed between the regeneration spray 37f and the first regeneration column demister 86. The washing-capturing space 37e is not provided with a structure such as a packed bed or a shelf for bringing the condensed water 9 into contact with the carbon dioxide-containing gas 8 while flowing down on the surface. That is, a structure or the like in which the condensed water 9 flows down on the surface is not provided between the regeneration spray 37f and the first regeneration column demister 86, and the washing-capturing space 37e is formed from the regeneration spray 37f to the first regeneration column demister 86. As a result, the washing-capturing space 37e is configured such that the condensed water 9 comes into contact with the carbon dioxide-containing gas 8 while freely dropping. The mist of the condensed water 9 sprayed from the regeneration spray 37f drops in the washing-capturing space 37e where the carbon dioxide-containing gas 8 rises, and directly reaches the first regeneration column demister 86. That is, the condensed water 9 that passes through the washing-capturing space 37e directly reaches the first regeneration column demister 86. While dropping, the condensed water 9 comes into contact with the carbon dioxide-containing gas 8, and the mist-like amine accompanying the carbon dioxide-containing gas 8 physically collides with the mist of the condensed water 9 and is captured.

The regeneration spray 37f sprays and drops the condensed water 9 toward the washing-capturing space 37e. The regeneration spray 37f may be configured similarly to the first spray 21b or the second spray 22f.

As described above, according to this embodiment, the condensed water 9 is sprayed by the regeneration spray 37f, and the amine accompanying the carbon dioxide-containing gas 8 is captured by the mist of the condensed water 9. As a result, the mist of the condensed water 9 can physically collide with the mist-like amine accompanying the carbon dioxide-containing gas 8 discharged from the amine regenerator 30a. For this reason, the mist-like amine can be effectively captured in the condensed water 9. Further, since the condensed water 9 has a low amine concentration, it is also possible to capture the gaseous amine accompanying the carbon dioxide-containing gas 8. For this reason, the washing efficiency of the carbon dioxide-containing gas 8 can be further improved, and the amount of amine discharged into the atmosphere can be further reduced. Further, since the amine can be removed from the carbon dioxide-containing gas 8, it is possible to increase the purity of carbon dioxide in the carbon dioxide-containing gas. For this reason, the application of carbon dioxide can be expanded.

Incidentally, the regeneration washer 37 according to the above-described embodiment is not limited to being applied to the carbon dioxide capture system 1 illustrated in FIG. 11, and can be applied to various carbon dioxide capture systems 1. For example, the regeneration washer 37 illustrated in FIG. 11 can also be applied to the carbon dioxide capture system 1 illustrated in FIGS. 3 to 10. Further, the first washer 21 in the absorption column 20 is not limited to having the configuration including the first spray 21b. For example, the first washer 21 may have a configuration similar to that of the second washer 22 illustrated in FIG. 1, and the carbon dioxide capturer 20a may be supplied with the lean liquid 5 from the liquid diffuser 20b illustrated in FIG. 3 and the like. In this case, the lean liquid 5 may be directly supplied from the lean liquid line 16 to the liquid diffuser 20b, and the bypass line 60 illustrated in FIG. 3 and the like may not be connected.

According to the above-described embodiments, the amount of discharged amine can be reduced.

Although several embodiments of the present invention have been described, these embodiments are presented as examples and are not intended to limit the scope of the invention. These new embodiments can be implemented in other various forms, and various omissions, replacements and changes can be made without departing from the gist of the invention. These embodiments and modifications thereof are included in the scope and the gist of the invention and are included in the invention described in the claims and the equivalent scope thereof. Further, as a matter of course, these embodiments can be partially combined as appropriate within the scope of the gist of the present invention.

The invention claimed is:

1. A carbon dioxide capture system comprising:
a carbon dioxide capturer configured to cause a carbon dioxide contained in a combustion exhaust gas to be absorbed into an absorbing liquid containing an amine;
an absorbing liquid regenerator configured to cause the carbon dioxide to be released from the absorbing liquid discharged from the carbon dioxide capturer to regenerate the absorbing liquid;
a first washer configured to wash the combustion exhaust gas discharged from the carbon dioxide capturer with a mist of a first cleaning liquid sprayed by a first spray to capture the amine accompanying the combustion exhaust gas;
a second washer configured to wash the combustion exhaust gas discharged from the first washer with a second cleaning liquid to capture the amine accompanying the combustion exhaust gas; and
an absorbing liquid line configured to supply the absorbing liquid regenerated in the absorbing liquid regenerator as the first cleaning liquid to the first spray, wherein
the first cleaning liquid sprayed by the first spray is supplied as the absorbing liquid to the carbon dioxide capturer,
wherein
the first washer has a first receiver arranged below the first spray and configured to receive and store the mist of the first cleaning liquid sprayed from the first spray, and a first washing-capturing space which is arranged below the first spray and in which the mist of the first cleaning liquid sprayed from the first spray comes into contact with the combustion exhaust gas while freely dropping, and
the first washing-capturing space is formed from the first spray to the first receiver and is free of a structure in which the first cleaning liquid flows down on a surface of the structure.

2. The carbon dioxide capture system according to claim 1, wherein
the first washer has a first circulation line configured to supply the first cleaning liquid in the first receiver to the first spray, and
the absorbing liquid line is connected to the first circulation line.

3. The carbon dioxide capture system according to claim 2, wherein
a first circulation pump is arranged in the first circulation line, and
the absorbing liquid line is connected to an upstream position of the first circulation line with respect to the first circulation pump.

4. The carbon dioxide capture system according to claim 2, wherein
a cleaning liquid distributor capable of distributing the first cleaning liquid to the first spray and the carbon dioxide capturer is arranged in the first circulation line,
the cleaning liquid distributor is arranged on a downstream side with respect to a connection position between the first circulation line and the absorbing liquid line,
a cleaning liquid distribution line configured to supply the first cleaning liquid to the carbon dioxide capturer is connected to the cleaning liquid distributor, and
the cleaning liquid distributor is capable of adjusting an amount of the first cleaning liquid supplied to the first spray and an amount of the first cleaning liquid supplied to the carbon dioxide capturer.

5. The carbon dioxide capture system according to claim 2, further comprising: a bypass line configured to supply the first cleaning liquid in the first receiver to the carbon dioxide capturer.

6. The carbon dioxide capture system according to claim 5, wherein
an absorbing liquid distributor capable of distributing the absorbing liquid to the first circulation line and the carbon dioxide capturer is arranged in the absorbing liquid line,
an absorbing liquid distribution line configured to supply the absorbing liquid to the carbon dioxide capturer is connected to the absorbing liquid distributor, and
the absorbing liquid distributor is capable of adjusting an amount of the absorbing liquid supplied to the first circulation line and an amount of the absorbing liquid supplied to the carbon dioxide capturer.

7. The carbon dioxide capture system according to claim 6, further comprising:
an absorbing liquid cooler configured to cool the absorbing liquid supplied from the absorbing liquid regenerator to the carbon dioxide capturer, wherein
the absorbing liquid cooler is arranged in the absorbing liquid line, and
the absorbing liquid distributor is arranged on a downstream side with respect to the absorbing liquid cooler.

8. The carbon dioxide capture system according to claim 6, further comprising:
an absorbing liquid cooler configured to cool the absorbing liquid supplied from the absorbing liquid regenerator to the carbon dioxide capturer, wherein
the absorbing liquid cooler is arranged in the absorbing liquid distribution line.

9. The carbon dioxide capture system according to claim 8, wherein the bypass line is arranged with a bypass cooler configured to cool the first cleaning liquid.

10. The carbon dioxide capture system according to claim 1, wherein the second washer sprays the second cleaning liquid with a second spray to capture the amine accompanying the combustion exhaust gas with a mist of the second cleaning liquid.

11. The carbon dioxide capture system according to claim 1, further comprising:
a first washer exit demister arranged between the first washer and the second washer and configured to trap the mist of the first cleaning liquid accompanying the combustion exhaust gas discharged from the first washer; and
a second washer exit demister configured to trap a mist accompanying the combustion exhaust gas discharged from the second washer, wherein
the porosity of the first washer exit demister is larger than the porosity of the second washer exit demister.

12. The carbon dioxide capture system according to claim 1, further comprising:
a cleaning liquid mist capturer arranged between the first washer and the second washer and configured to capture the mist of the first cleaning liquid accompanying the combustion exhaust gas discharged from the first washer, wherein
the cleaning liquid mist capturer has a mist capture packed bed configured to capture the mist of the first cleaning liquid.

13. The carbon dioxide capture system according to claim 1, further comprising: a third washer configured to wash the combustion exhaust gas discharged from the second washer with a third cleaning liquid to capture the amine accompanying the combustion exhaust gas.

14. The carbon dioxide capture system according to claim 1, further comprising:
a regeneration washer, wherein
the absorbing liquid regenerator discharges a regeneration exhaust gas containing the carbon dioxide, and
the regeneration washer washes the regeneration exhaust gas discharged from the absorbing liquid regenerator with a mist of a regeneration cleaning liquid sprayed by a regeneration spray to capture an amine accompanying the regeneration exhaust gas.

* * * * *